(12) United States Patent  (10) Patent No.: US 7,798,725 B2
Khemakhem et al.  (45) Date of Patent: *Sep. 21, 2010

(54) HYBRID FIBER/COPPER CONNECTOR SYSTEM AND METHOD

(75) Inventors: M'hamed Anis Khemakhem, Minnetonka, MN (US); Jeffrey Louis Peters, Eagan, MN (US); Duane Sand, Brooklyn Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 147 days.

This patent is subject to a terminal disclaimer.

(21) Appl. No.: 12/156,946

(22) Filed: Jun. 4, 2008

(65) Prior Publication Data

US 2009/0180739 A1    Jul. 16, 2009

Related U.S. Application Data

(63) Continuation of application No. 11/107,414, filed on Apr. 15, 2005, now Pat. No. 7,393,144.

(51) Int. Cl.
    G02B 6/38    (2006.01)
(52) U.S. Cl. .......................................... 385/75; 385/139
(58) Field of Classification Search ........................ None
    See application file for complete search history.

(56) References Cited

U.S. PATENT DOCUMENTS

| | | |
|---|---|---|
| 4,373,777 A | 2/1983 | Borsuk et al. |
| 4,568,145 A | 2/1986 | Colin et al. |
| 4,728,171 A | 3/1988 | Schofield et al. |
| 5,109,452 A | 4/1992 | Selvin et al. |
| 5,242,315 A | 9/1993 | O'Dea |
| 5,745,622 A | 4/1998 | Birnbaum et al. |
| 5,982,971 A | 11/1999 | Amirkalali |
| 6,115,159 A | 9/2000 | Baker |
| 6,234,683 B1 | 5/2001 | Waldron et al. |
| 6,254,278 B1 | 7/2001 | Andrews et al. |
| 6,357,931 B1 | 3/2002 | Shirakawa et al. |
| 6,475,009 B2 | 11/2002 | Below et al. |
| 6,478,625 B2 | 11/2002 | Tolmie et al. |
| 6,579,014 B2 | 6/2003 | Melton et al. |
| 6,612,857 B2 | 9/2003 | Tolmie |
| 6,648,520 B2 | 11/2003 | McDonald et al. |

(Continued)

FOREIGN PATENT DOCUMENTS

DE    202 02 835 U1    3/2003

(Continued)

OTHER PUBLICATIONS

LEMO 3K.93C Series Connector Brochure, 22 pages (Publicly known prior to Apr. 15, 2005).

(Continued)

*Primary Examiner*—Sarah Song
(74) *Attorney, Agent, or Firm*—Merchant & Gould P.C.

(57) ABSTRACT

A junction box and hybrid fiber optic cable connector which permit repair of damaged fibers or copper conductors carried by a hybrid fiber/copper cable without requiring replacement of the entire cable assembly or retermination of the cable. A hybrid fiber/copper connector including cable management within the connector housing. A method of assembling a hybrid fiber/copper connector.

20 Claims, 31 Drawing Sheets

U.S. PATENT DOCUMENTS

| | | |
|---|---|---|
| 6,719,461 B2 | 4/2004 | Cull |
| 6,733,185 B2 | 5/2004 | Zhao et al. |
| 6,739,759 B1 | 5/2004 | Seeley |
| 6,856,748 B1 | 2/2005 | Elkins, II et al. |
| 6,962,445 B2 | 11/2005 | Zimmel et al. |
| 7,111,990 B2 | 9/2006 | Melton et al. |
| 7,213,975 B2 | 5/2007 | Khemakhem et al. |
| 7,393,144 B2 * | 7/2008 | Khemakhem et al. ......... 385/75 |

FOREIGN PATENT DOCUMENTS

| | | |
|---|---|---|
| EP | 0 204 581 A2 | 12/1986 |
| GB | 2 154 333 A | 9/1985 |
| WO | WO 2006/039084 A1 | 4/2006 |

OTHER PUBLICATIONS

LEMO® USA, Inc., LEMO's Audio Video Connectors—Coax, Triax, Fiber Optic and Hybrid Applications, 2003, pp. 1-51.

Telecast Fiber Systems, Inc., Cobra™, Triax-to-Fiber Camera Interface—Now for High Definition and High Speed Cameras, 2003, pp. 1-2.

Telecast Fiber Systems, Inc., SHED™, SMPTE Hybrid Elimination Devices, 2003, pp. 1-2.

* cited by examiner

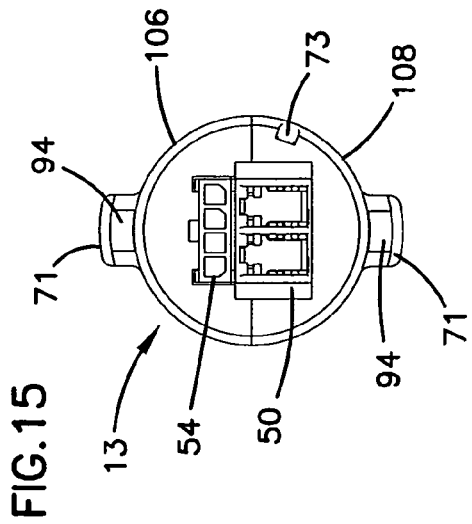
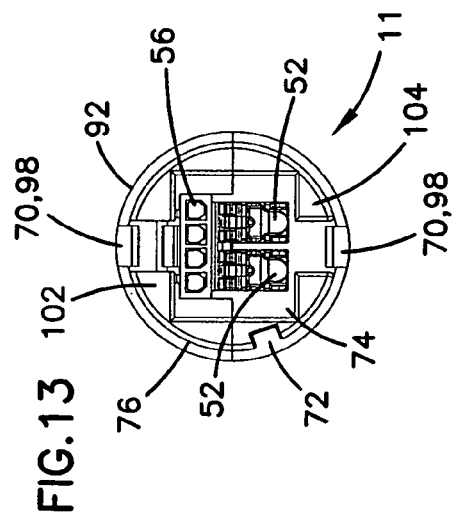

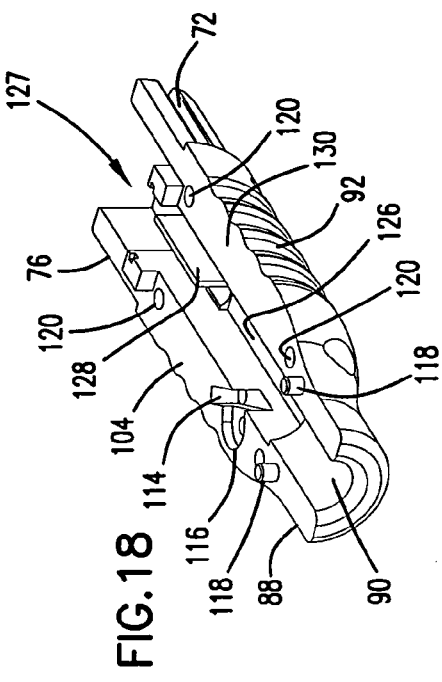
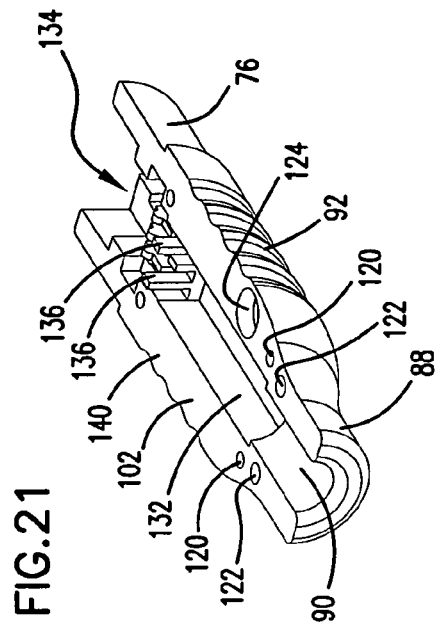
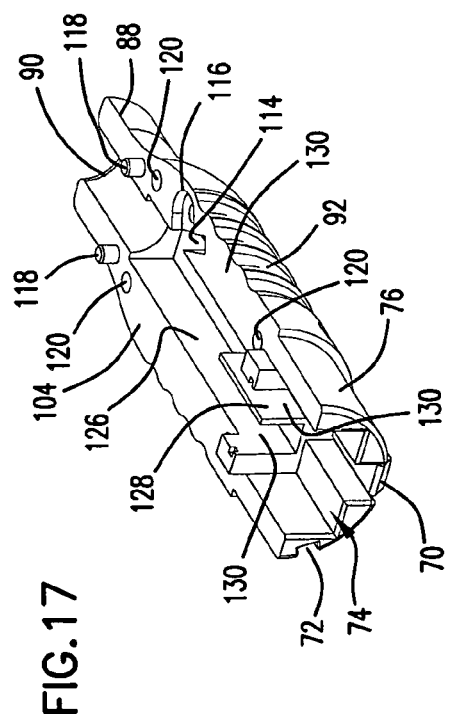
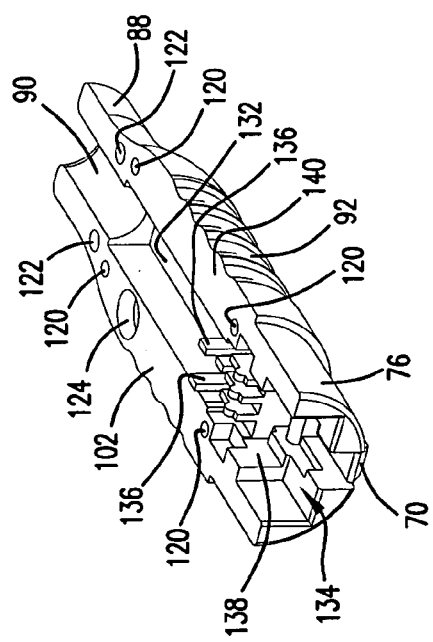

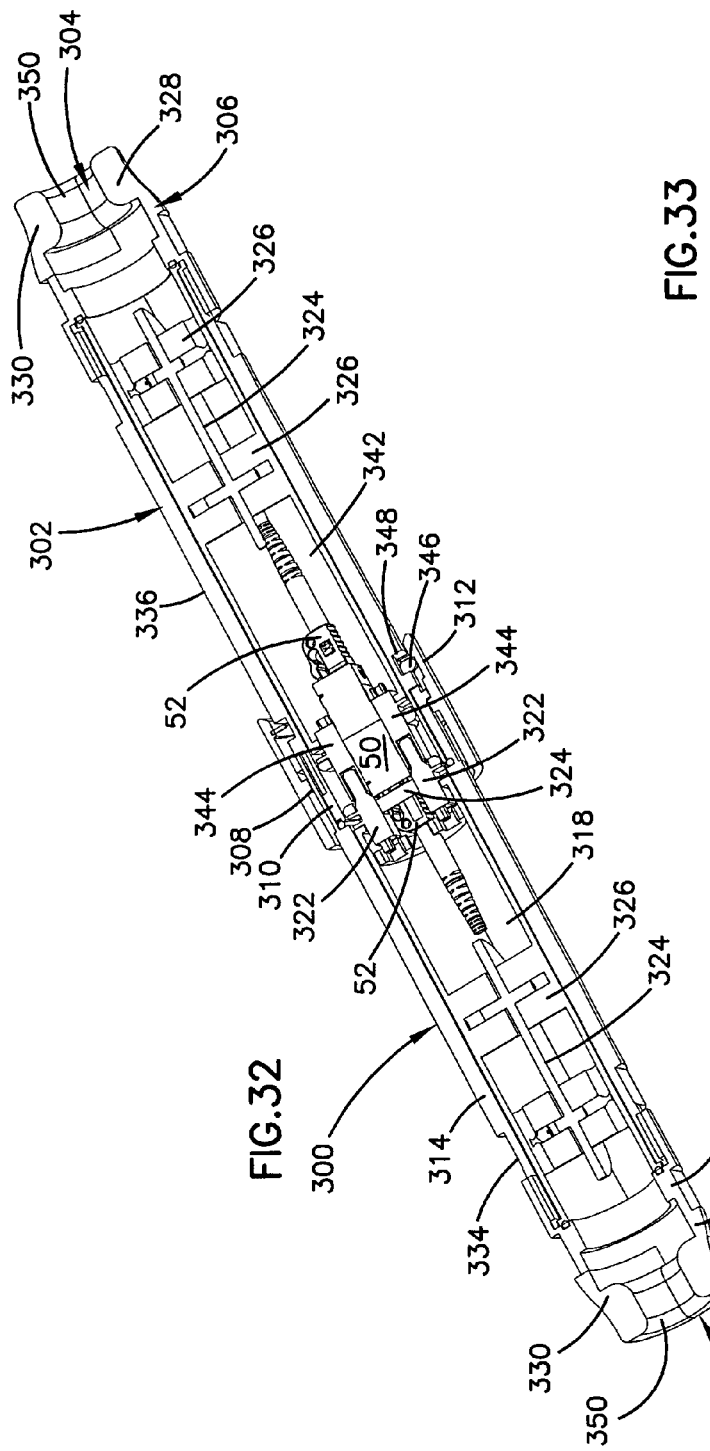
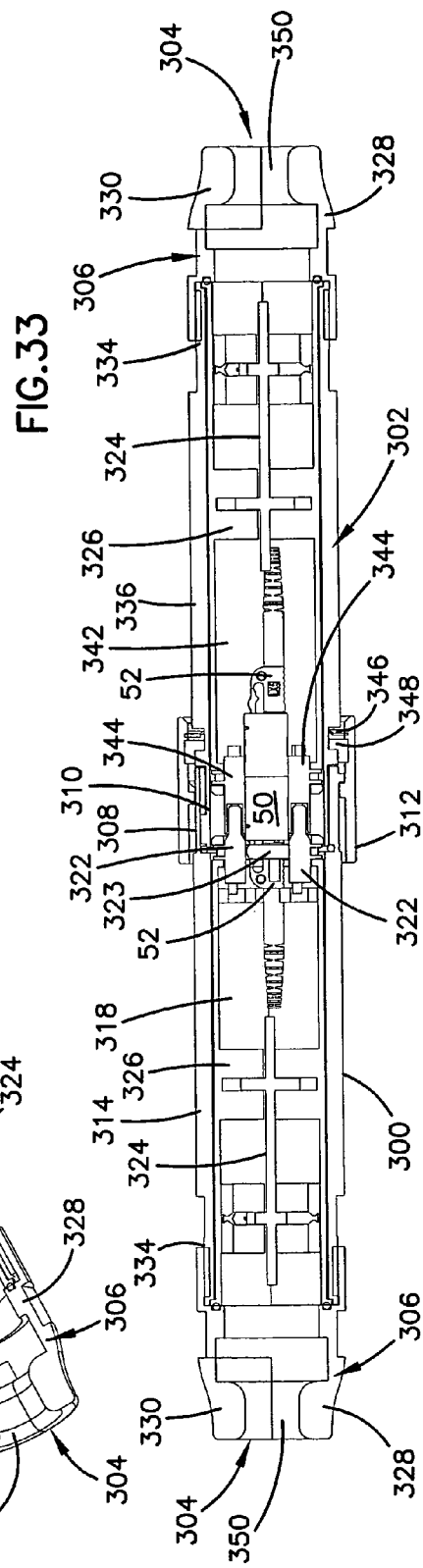

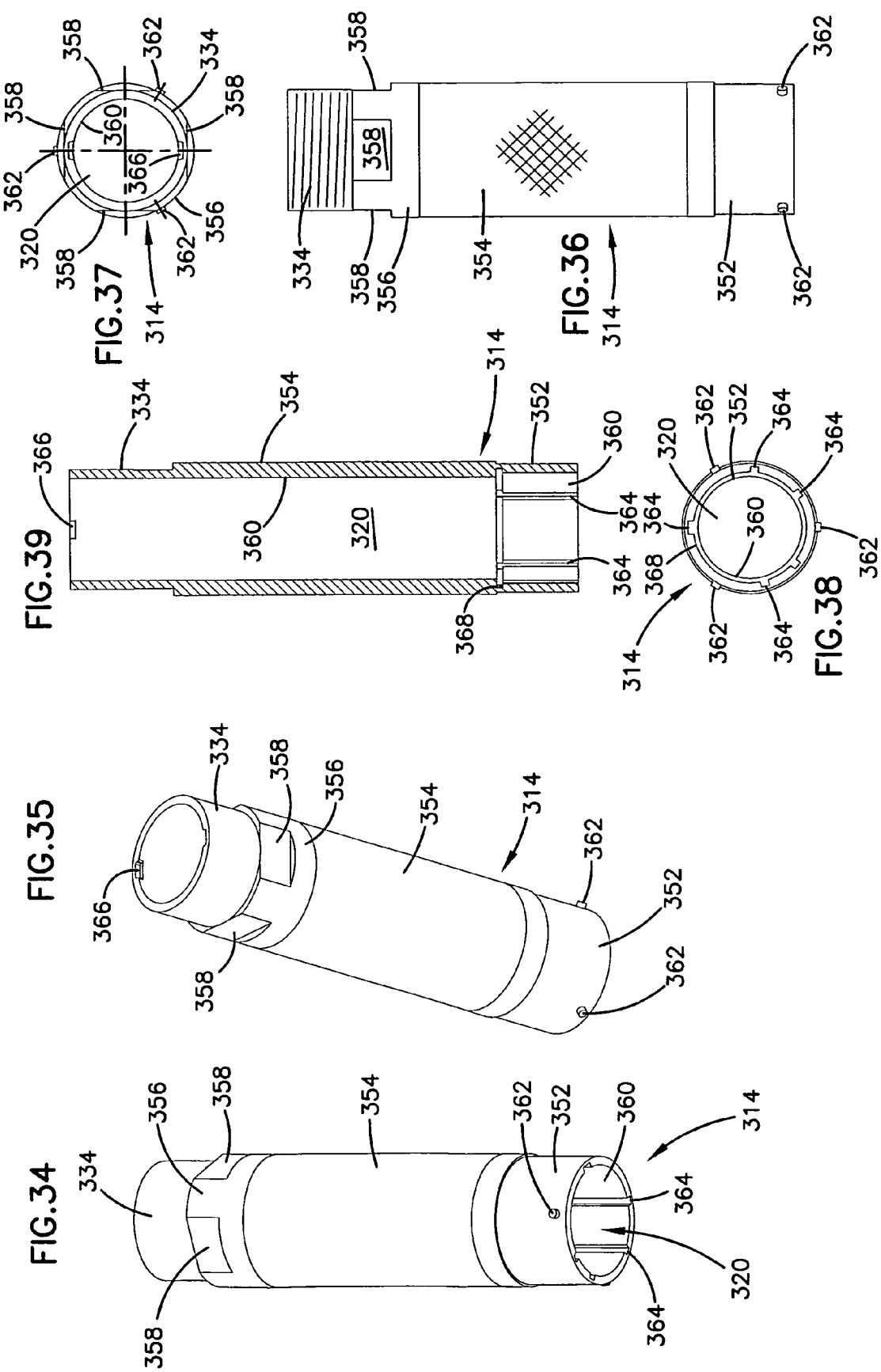

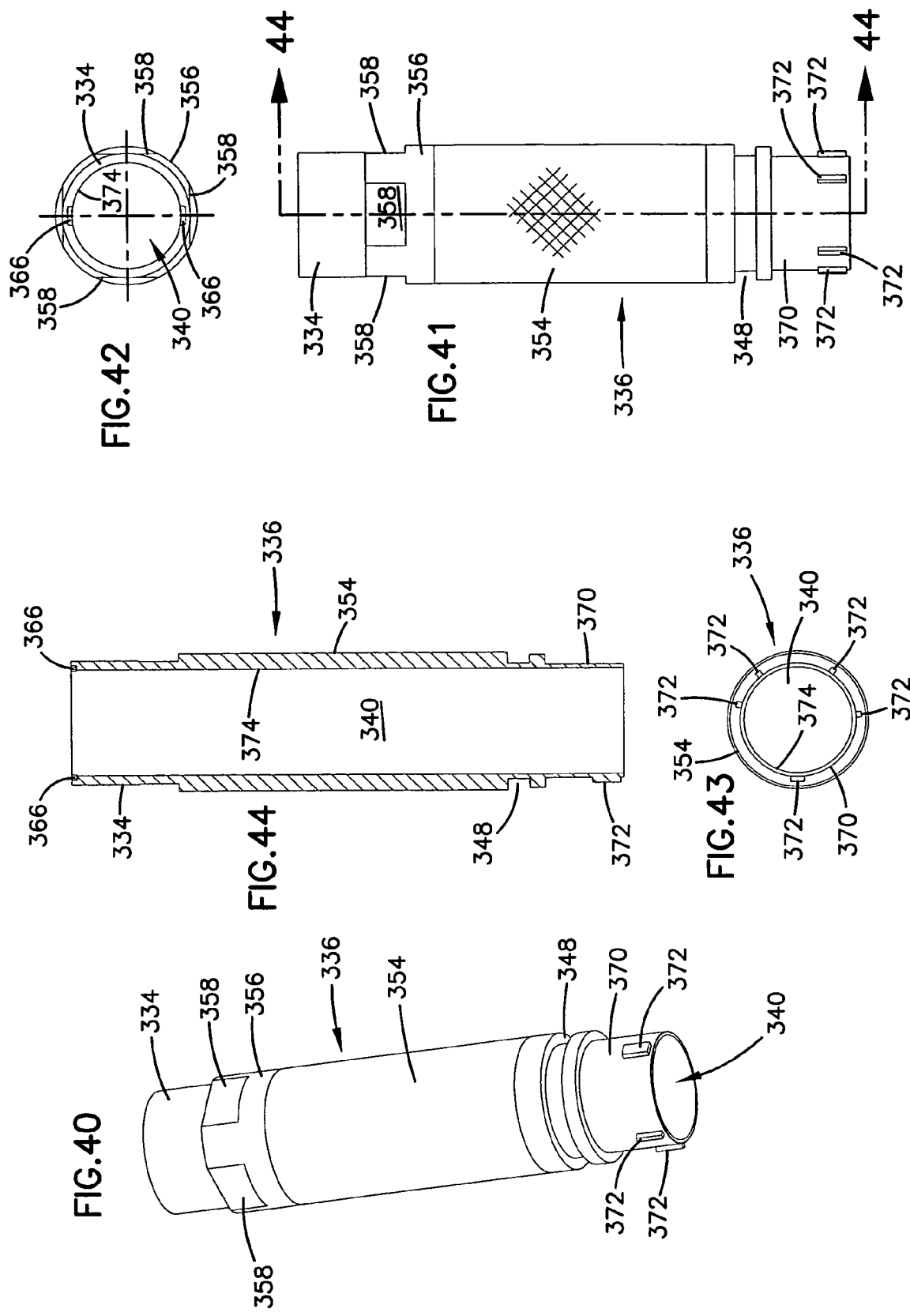

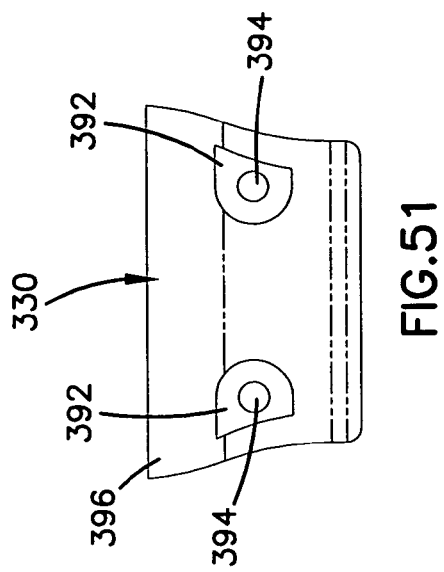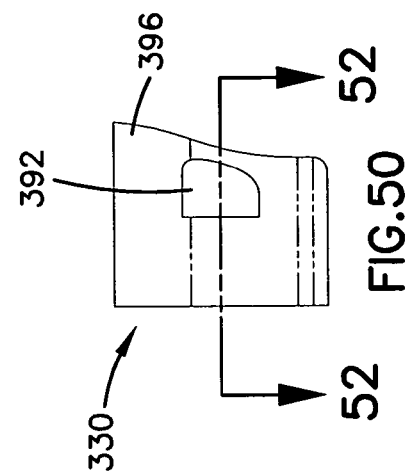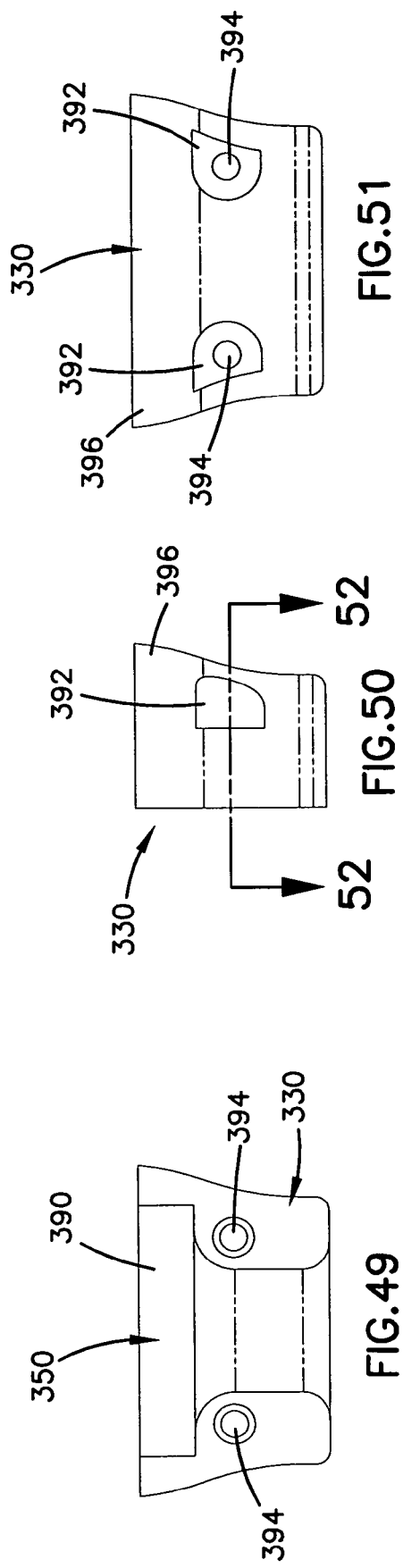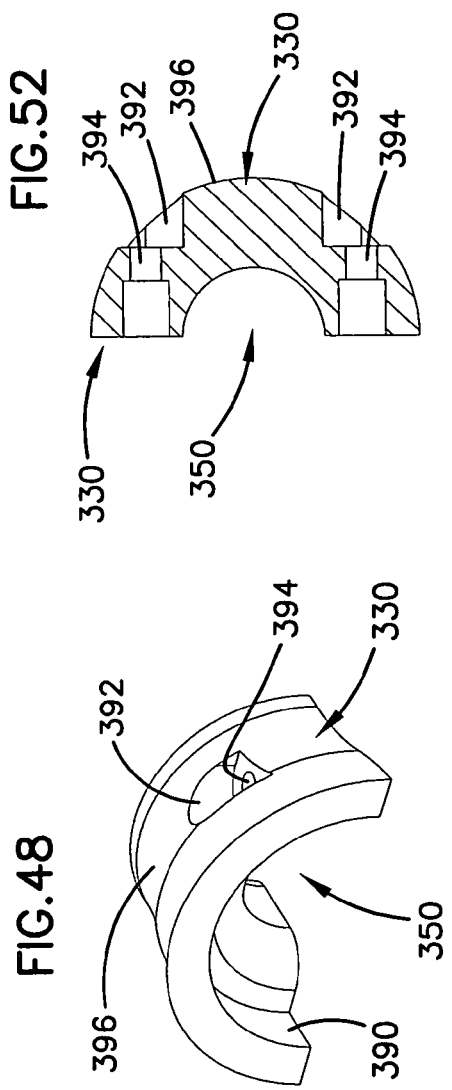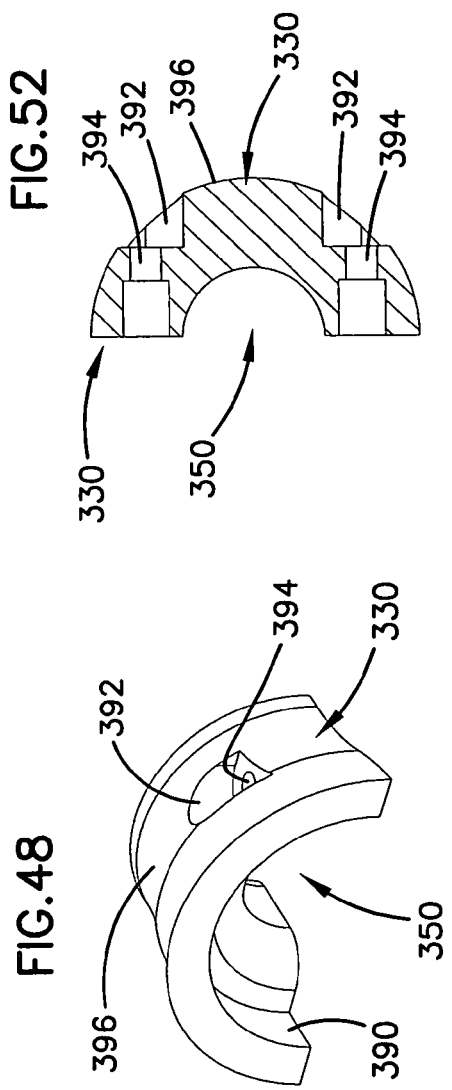

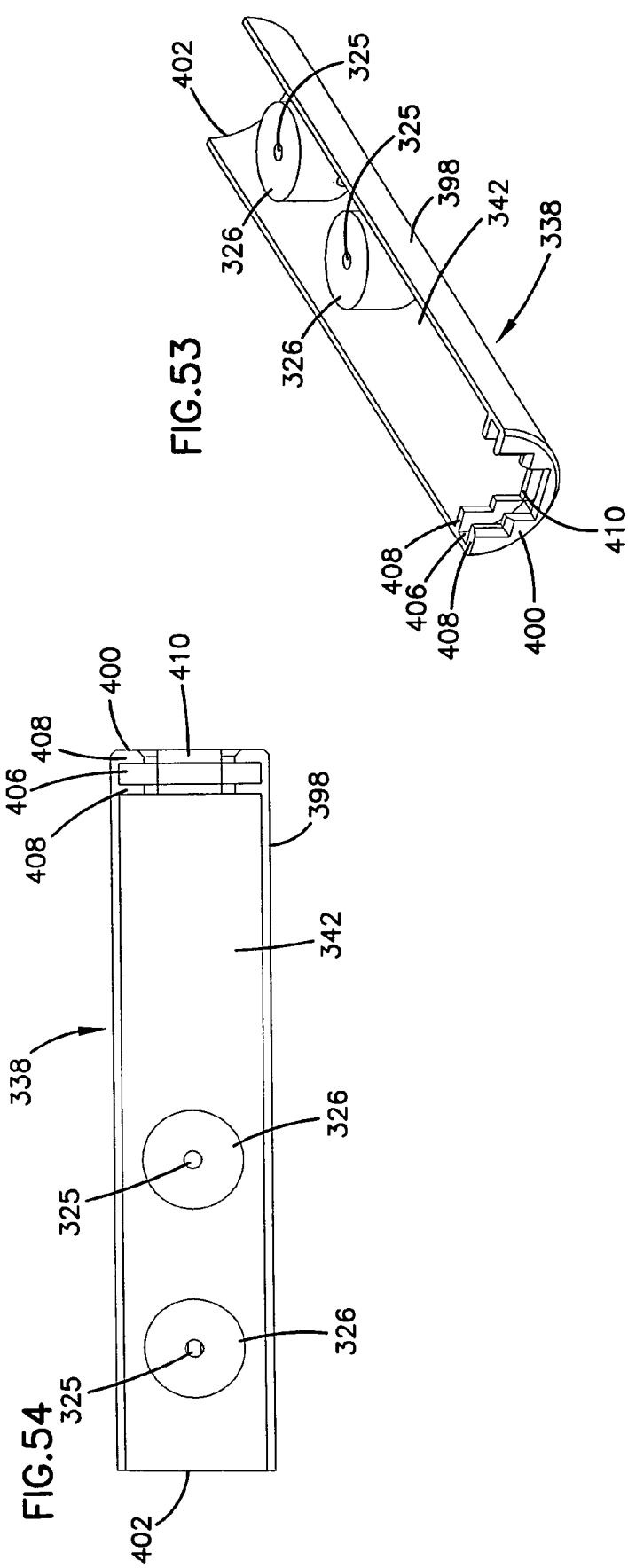
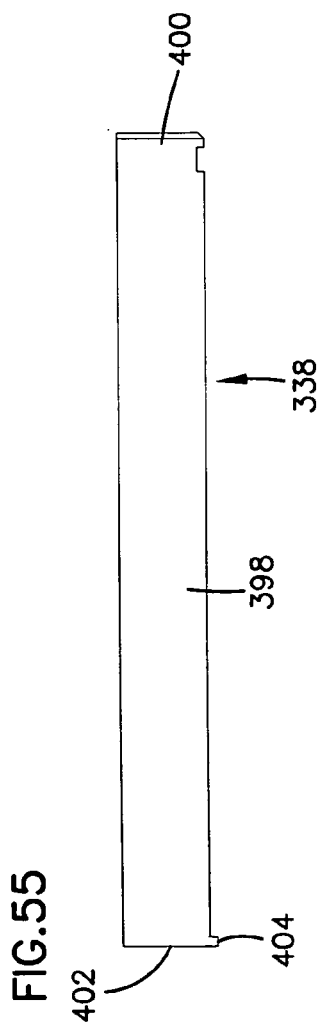
FIG. 53
FIG. 54
FIG. 55

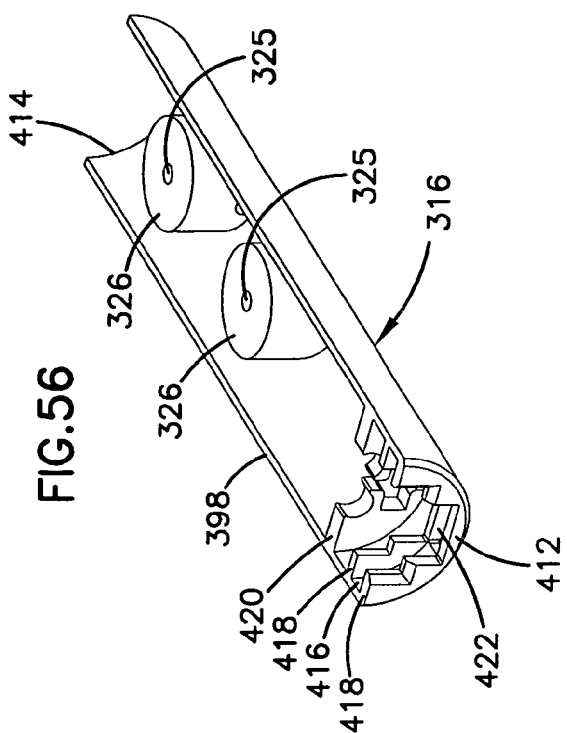
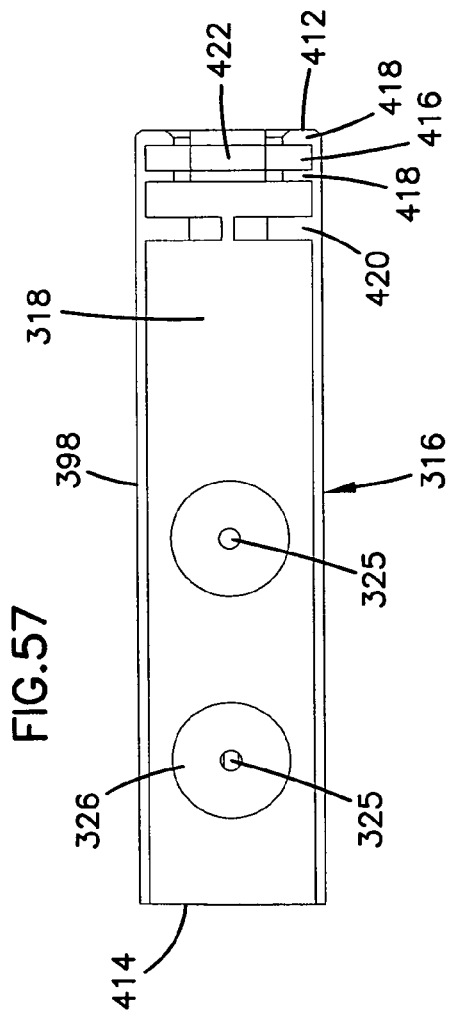
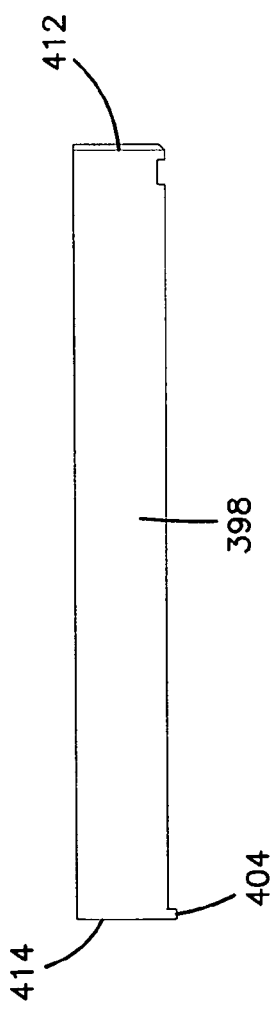

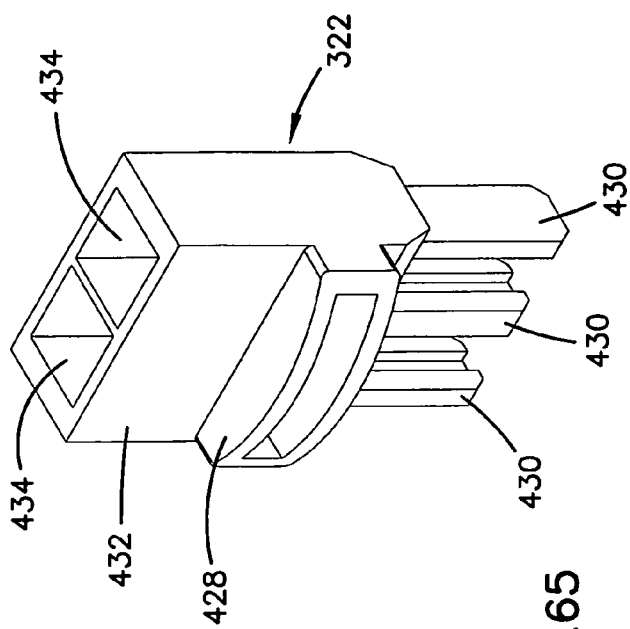
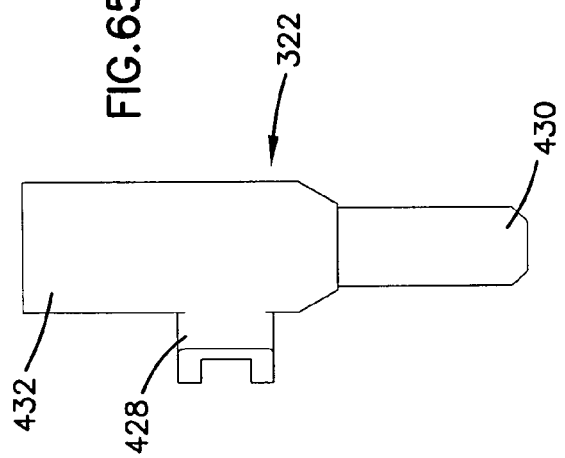
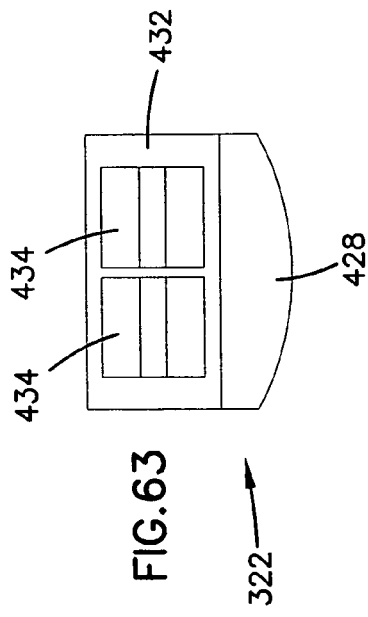
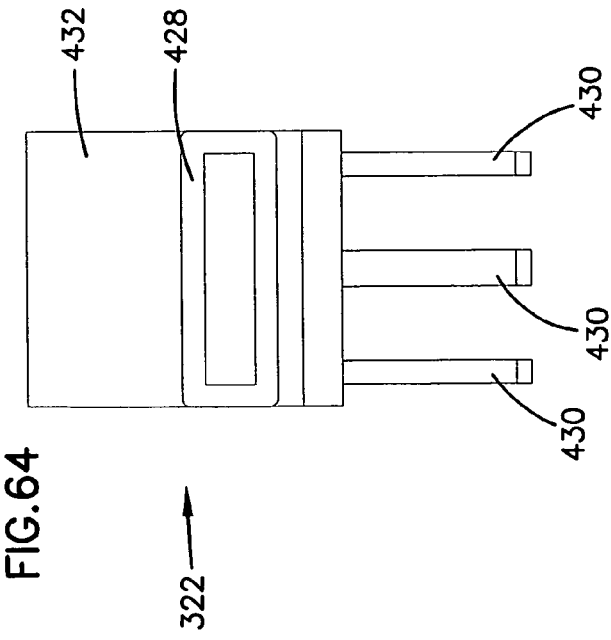

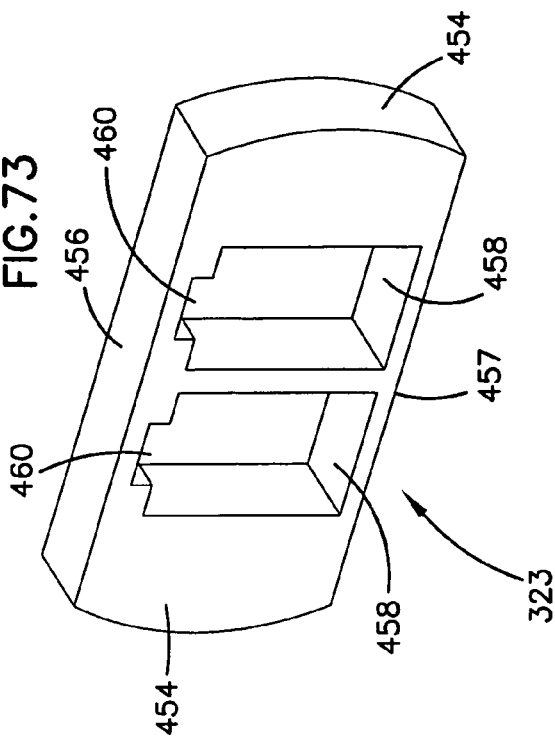
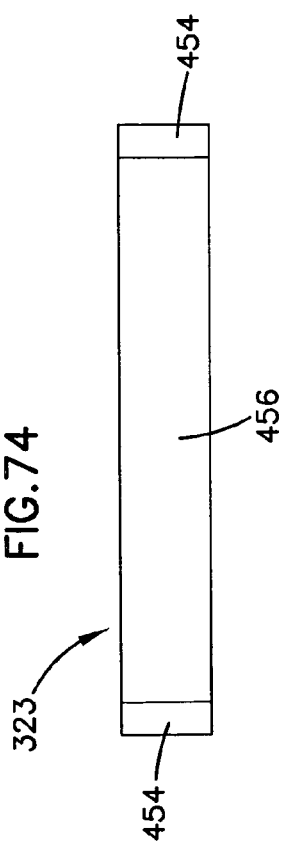
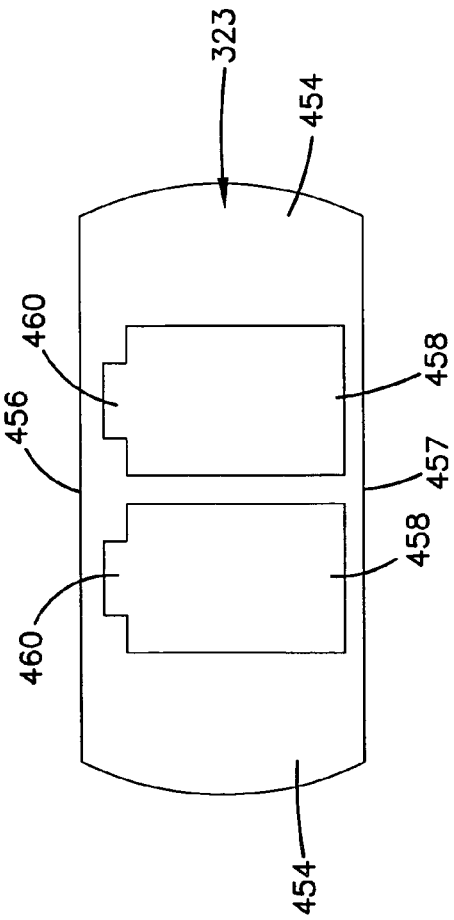

HYBRID FIBER/COPPER CONNECTOR SYSTEM AND METHOD

CROSS REFERENCE TO RELATED APPLICATIONS

This application is a continuation of application Ser. No. 11/107,414, filed Apr. 15, 2005 now U.S. Pat. No. 7,393,144, which application is incorporated herein by reference.

The present application relates to application Ser. No. 10/938,136, filed on Sep. 10, 2004, the disclosure of which is incorporated herein by reference.

FIELD

The present invention relates generally to connectors for communications cable. More specifically, the present invention relates to hybrid fiber/copper connector systems and methods.

BACKGROUND

It is known to provide portable cameras and other data or image gathering devices with cable to provide power to the device and to carry data to and from the device. As these devices have increased in image or data gathering capacity, greater demand for bandwidth to carry data to and from the devices has arisen. One way of providing this increased bandwidth is to use optical fiber for carrying data to and from the devices.

However, optical fiber may not be able to provide an adequate power supply for the devices, so it is still desirable to have copper or other metallic wires extending to the devices. Hybrid cables including both copper and optical fiber within a single cable have been used to meet the power and data transfer needs of these devices. Since the techniques and devices for terminating and connectorizing copper and fiber cables are quite different, new connectors or methods of connecting such hybrid cables to each have been developed. These known connectors do allow interconnection of cables and devices but require that the entire connector be replaced if any one element of the cable or connector are damaged. Common hybrid cables may include two or more optical fibers and one or more pairs of copper wires. If any of these wires or optical fibers, or the termination of these wires or optical fibers are damaged, the entire connector must be replaced and all of the wires and fibers re-terminated.

Improvements to hybrid connectors are desirable.

SUMMARY

The present invention relates generally to a hybrid fiber/copper connector. More specifically, the present invention relates to a junction box and hybrid fiber optic cable connector which permit repair of damaged fibers or copper conductors carried by a hybrid fiber/copper cable without requiring replacement of the entire cable assembly or retermination of the cable. The present invention also relates to connectors for hybrid fiber/copper cables. The present invention also relates to a junction box for use with hybrid cables. The present invention further relates to a method of repairing a hybrid fiber/copper cable and connector.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 12 is a perspective view of the mating cable connector of FIG. 11.

FIG. 13 is an end view of the mating cable connector of FIG. 11.

FIG. 14 is a perspective view of the second mating cable connector of FIG. 5.

FIG. 15 is an end view of the cable connector of FIG. 14.

FIG. 17 is a first perspective view of the first housing half of FIG. 16.

FIG. 18 is a second perspective view of the first housing half of FIG. 16.

FIG. 20 is a first perspective view of the second housing half of FIG. 16.

FIG. 21 is a second perspective view of the second housing half of FIG. 16.

FIG. 32 is a perspective cross-sectional view of the mating pair of cable connectors of FIG. 29.

FIG. 33 is a side cross-sectional of the mating pair of cable connectors of FIG. 29.

FIG. 34 is a first perspective view of an outer housing for use with the connector of FIG. 30.

FIG. 35 is a second perspective view of the outer housing of FIG. 34.

FIG. 36 is a side view of the outer housing of FIG. 34.

FIG. 37 is a cable end view of the outer housing of FIG. 34.

FIG. 38 is a mating end view of the outer housing of FIG. 34.

FIG. 39 is a side cross-sectional view of the outer housing of FIG. 34.

FIG. 40 is a perspective view of an outer housing for use with the connector of FIG. 31.

FIG. 41 is a side view of the outer housing of FIG. 40.

FIG. 42 is a cable end view of the outer housing of FIG. 40.

FIG. 43 is a mating end view of the outer housing of FIG. 40.

FIG. 44 is a side cross-sectional view of the outer housing of FIG. 40.

FIG. 48 is a perspective view of a second portion of cable clamp for use with the cable connectors of FIG. 29.

FIG. 49 is a first side view of the cable clamp portion of FIG. 48.

FIG. 50 is an end view of the cable clamp portion of FIG. 48.

FIG. 51 is a second side view of the cable clamp portion of FIG. 48.

FIG. 52 is a top cross-sectional view of the cable clamp portion of FIG. 48, taken along line 52-52 in FIG. 50.

FIG. 53 is a perspective view of an inner housing half for use with the cable connector of FIG. 31.

FIG. 54 is a top view of the inner housing half of FIG. 53.

FIG. 55 is a side view of the inner housing half of FIG. 53.

FIG. 56 is a perspective view of an inner housing half for use with the cable connector of FIG. 30.

FIG. 57 is a top view of the inner housing half of FIG. 56.

FIG. 58 is a side view of the inner housing half of FIG. 56.

FIG. 62 is a perspective of first electrical pin connector for use with the connectors of FIG. 30.

FIG. 63 is an end view of the electrical pin connector of FIG. 62.

FIG. 64 is a first side view of the electrical pin connector of FIG. 62.

FIG. 65 is a second side view of the electrical connector of FIG. 62.

FIG. 73 is a perspective view of a fiber connector retainer for use with the hybrid cable connector of FIG. 30.

FIG. 74 is a side view of the fiber connector retainer of FIG. 73.

FIG. 75 is an end view of the fiber connector retainer of FIG. 73.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
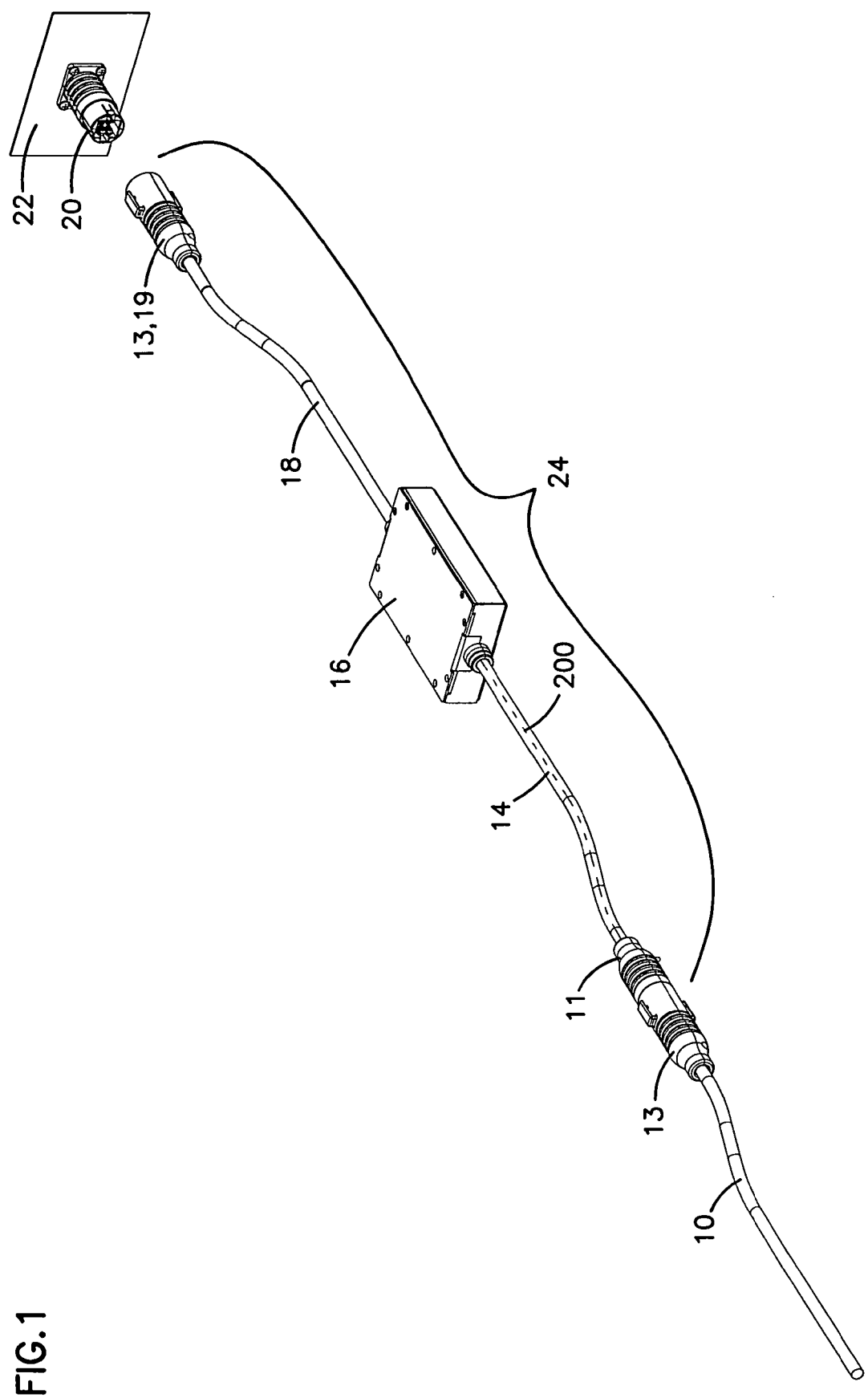
FIG. 1 is a perspective view of a hybrid fiber/copper cable assembly for connecting to a camera and including a junction box between a pair of cable connectors, with a optical fiber repair shown in dashed lines along one of the cable segments.

FIG. 1 illustrates a several segments of hybrid fiber and copper broadcast communications cable such as might be used to connect a camera to a production facility, such as at a sporting event or other entertainment venue. The segments of cable shown in FIG. 1 include a first segment 10 extending from the production facility and terminated with a first cable connector 13. Connector 13 is mated with a second cable connector 11 which terminates a second cable segment 14. Cable segment 14 extends from one end of a junction box 16 and a third cable segment 18 extends from the other end. Cable segment 18 is terminated with a third cable connector 19 (similar to first connector 13), which is configured to mate with a bulkhead mounted connector 20 positioned on a bulkhead 22, which may form a portion of a camera. Second and third cable segments 14 and 18, with second and third connectors 11 and 19, along with junction box 16, may make up a camera connection assembly 24 that a camera operator would carry, such as on a belt mount, when operating a shoulder carried or other portable or mobile camera configuration.

Known assemblies for connecting a camera to a broadcast cable might require the use of a new assembly in case of failure of any single component within the assembly. Alternatively, the failure of any of the contacts within either connector might necessitate the retermination of one of the cable segments. As will be described further below, connectors 11 and 19, in conjunction with junction box 16, permit easier repair or replacement of damaged components of assembly 24. Shown in dashed lines along segment 14 between junction box 16 and connector 11 is a replacement fiber 200, which will be described in further detail below.

Figure 2:
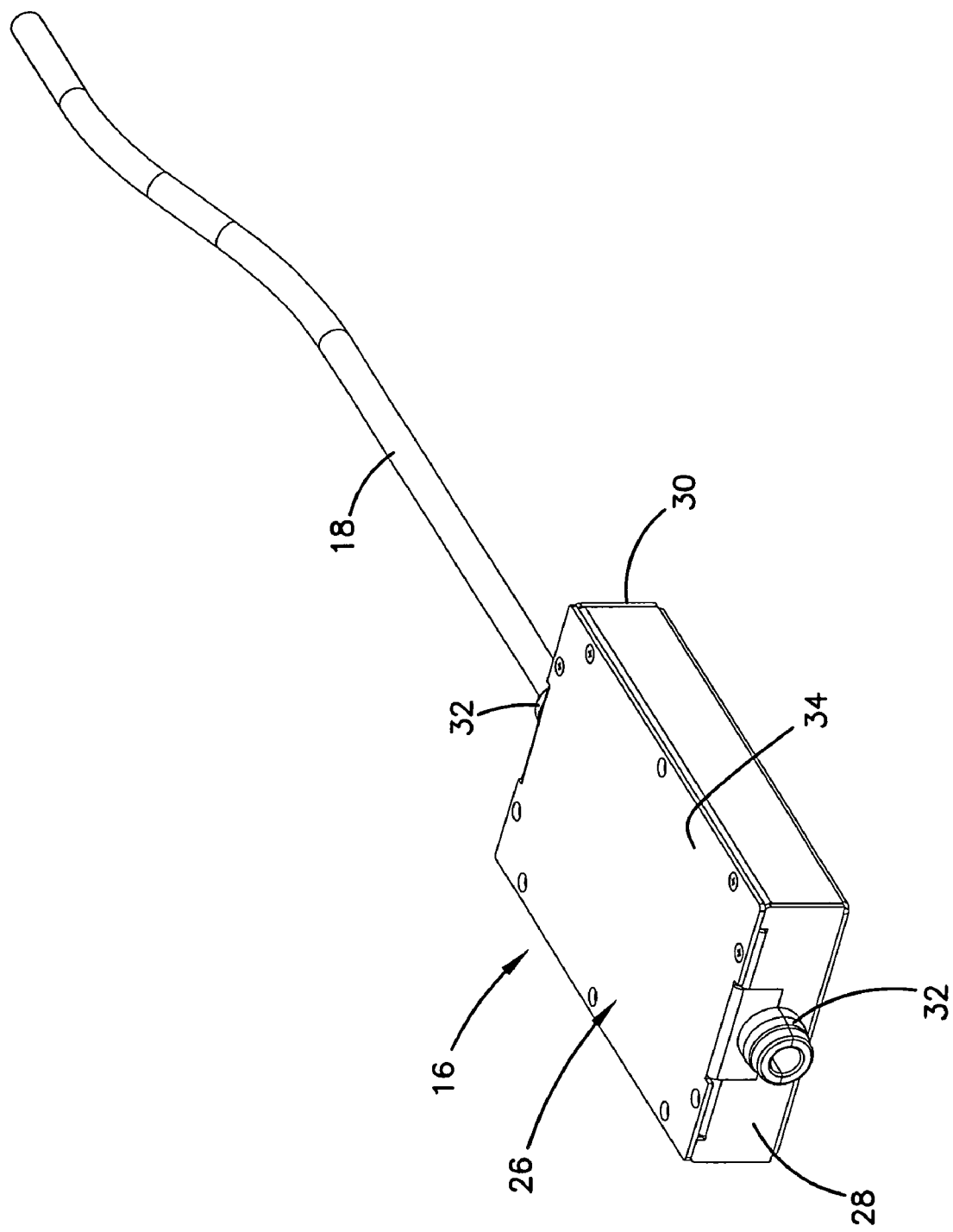
FIG. 2 is a perspective view of the junction box of FIG. 1, with a first hybrid cable extending from one side of the junction box.

Referring now to FIG. 2, junction box 16 includes a first end 28 and a second end 30. In each end is a cable entry fitting 32 to permit cable segments 14 and 18 to enter junction box 16. Fittings 32 provide a seal about cable segments 14 and 18 to prevent entry of environmental contaminants into junction box 16. Junction box 16 also includes a housing 26 with a removable cover 34 permitting access to an interior of junction box 16 for repair or replacement of components within junction box 16.

Figure 3:
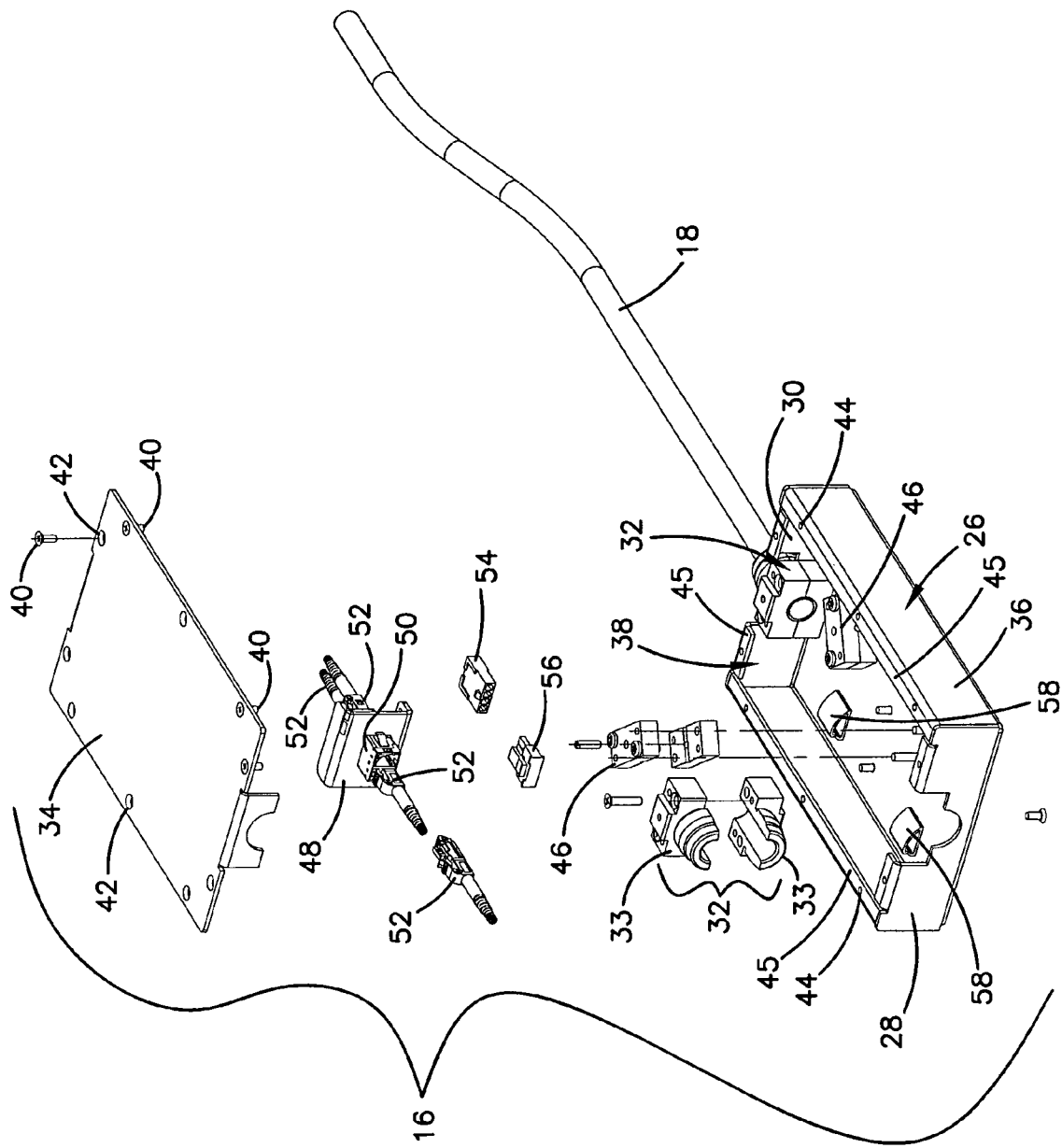
FIG. 3 is an exploded perspective view of the junction box of FIG. 2, with fiber connectors shown for a second hybrid cable.

Referring now to FIG. 3, housing 26 of junction box 16 includes a main housing 36 which cooperates with cover 34 to define an interior 38 within which different components to connect fiber strands and copper conductors of cable segments 14 and 18. Fittings 32 may include a pair of identical halves 33 which fit closely about cable segments 14 and 18.

Other alternative configurations of fittings 32 are anticipated provided they permit extension of additional cables external to segments 14 or 18 from interior 38. Cover 34 may be removably held to main housing 36 by a plurality of removable fasteners such as screws 40 extending through openings 42 in cover 34 and engaging mating openings 44 in flanges 45 of main housing 36.

Within interior 38 may be a pair of anchors 46 for receiving and securing a linear strength member which extend within either of cable segments 14 and 18. Also mounted within interior 38 is a bulkhead 48 with a fiber optic adapter 50 mounted to it. Fiber optic adapter 50 is configured to receive two fiber optic connectors 52 in each end. Known adapter 50 is a standard fiber optic adapter to align and optically connect pairs of connectors 52, and known connectors 52 may be mounted to the end of and terminate optical fibers extending within each of cable segments 14 and 18. As shown, connector 52 is a LX.5 format connector and adapter 50 is configured to receive and optically two connect LX.5 connectors. Other styles and types of fiber optic connectors and mating adapters may be used within junction box 16. Also within interior 38 may be a pair of mating pin connectors 54 and 56, which may terminate copper conductors extending within each of cable segments 14 and 18, and also to electrically connect these copper conductors. Other types and styles of connectors for connecting copper conductors may also be used within junction box 16. Interior 38 may also include one or more cable routing features 58 to aid the positioning of optical fibers and copper conductors within junction box 16.

Figure 4:
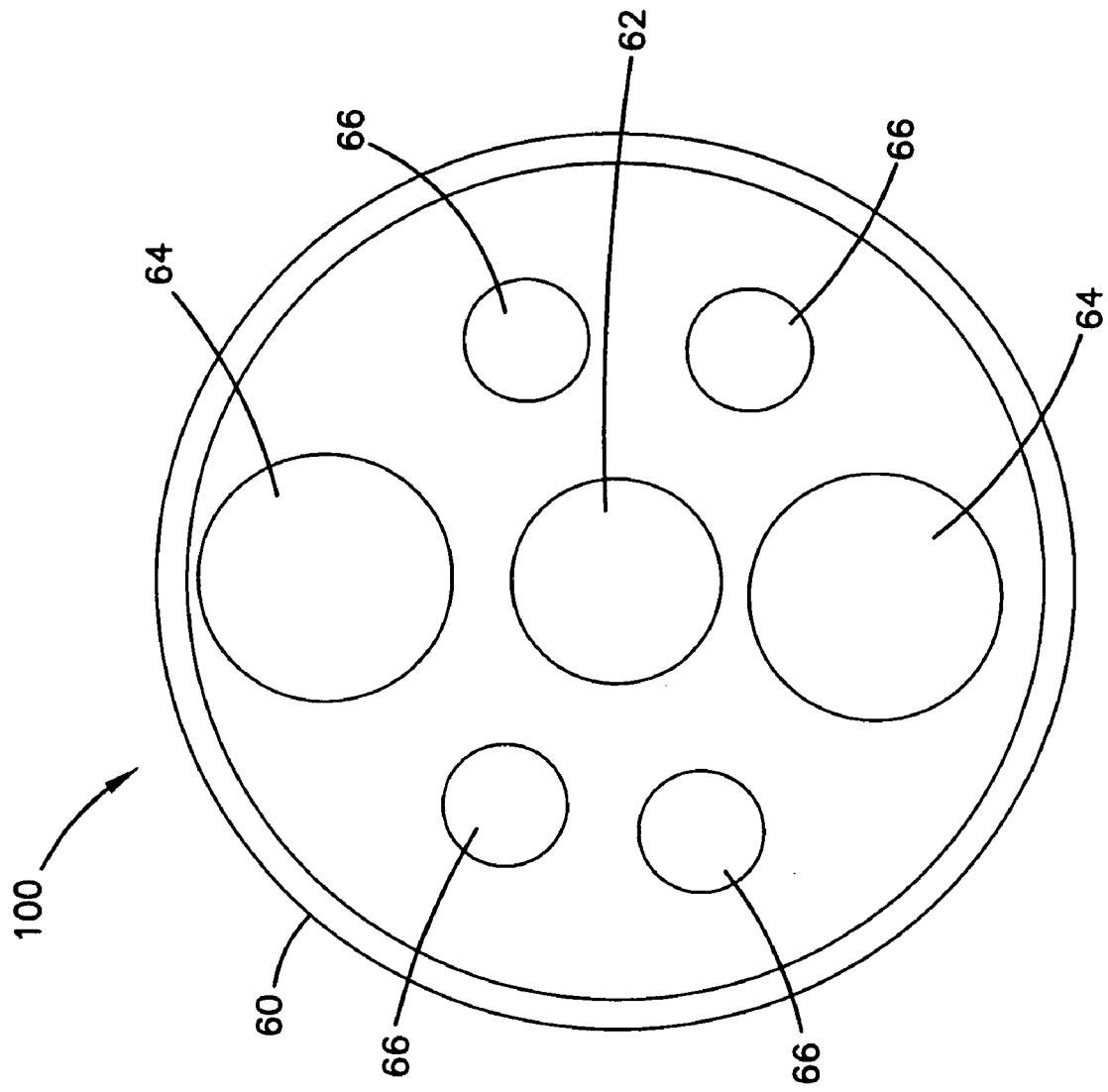
FIG. 4 is a schematic cross-section of a prior art hybrid fiber/copper cable including two optical fibers and four copper wires.

FIG. 4 illustrates a schematic cross-section of a hybrid fiber/copper communications cable 100, such as might be used for cable segments 10, 14 and 18. Cable 100 includes an outer sheath 60 and may include a linearly extending central strength member 62. Cable 100 as shown includes a pair of jacketed optical fibers 64 and four jacketed copper conductors 66, positioned within outer sheath 60 and extending adjacent strength member 62. Other configurations of hybrid cables are known, with more or fewer optical fibers and/or copper conductors. When used in the broadcast camera environment described above, one of the optical fibers 64 may be used to transmit video and related audio signals to the camera and the second optical fiber 64 may be used to transmit video and audio captured by the camera to the production facility or some other location. One pair of copper conductors 66 may be used to provide power to operate the camera, while the other pair of copper conductors 66 may be used to provide communications between the production facility and the camera operator. The number of fiber strands and copper conductors extending within cable 100 may be varied as required to support the desired usage and communication bandwidth of the camera.

Figure 5:
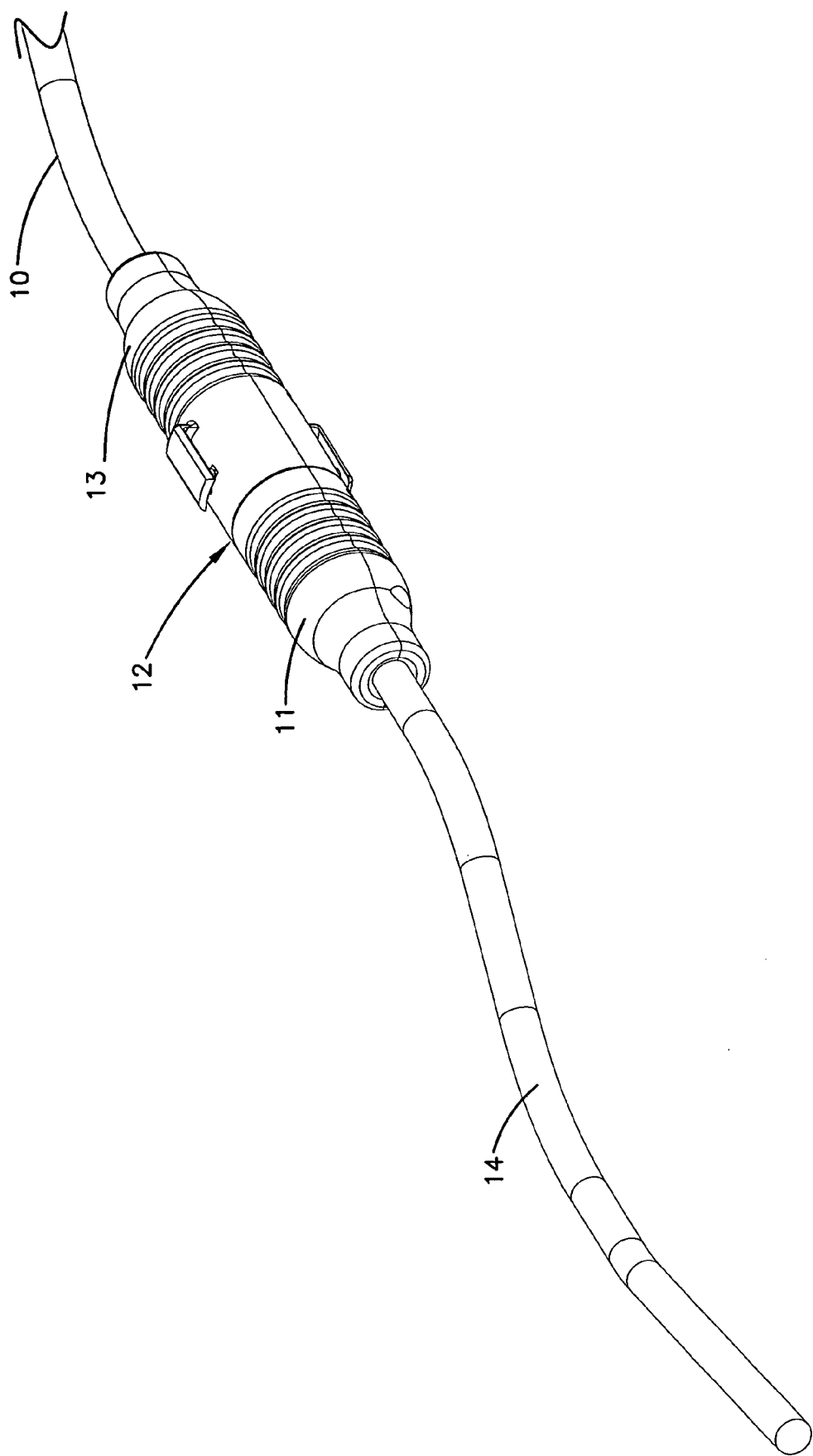
FIG. 5 is a perspective view of a pair of mating hybrid cable connectors of FIG. 1.
Figure 6:
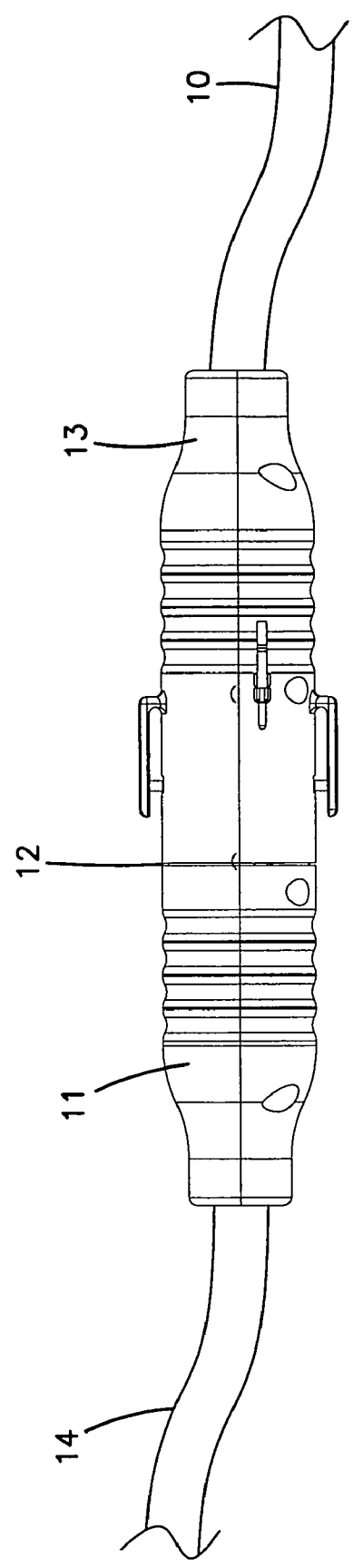
FIG. 6 is a side view of the pair of mating hybrid cable connectors of FIG. 5.

FIGS. 5 and 6 show first cable segment 10 terminated by connector 11, with connector 11 mated with connector 13 which terminates second cable segment 14, as shown in FIG. 1. Connectors 11 and 13 cooperate to optically connect the fiber strands 64 of cable segment 10 with those of cable segment 14, and to electrically connect copper conductors 66 of cable segment 10 with copper conductors 66 of cable segment 14. These two connectors cooperate to form a secure and generally weather-tight cover 12 about the connections of the fiber strands and copper conductors. As shown, connector 11 is defined as a male or plug connector and connector 13 is a female or socket connector.

Figure 7:
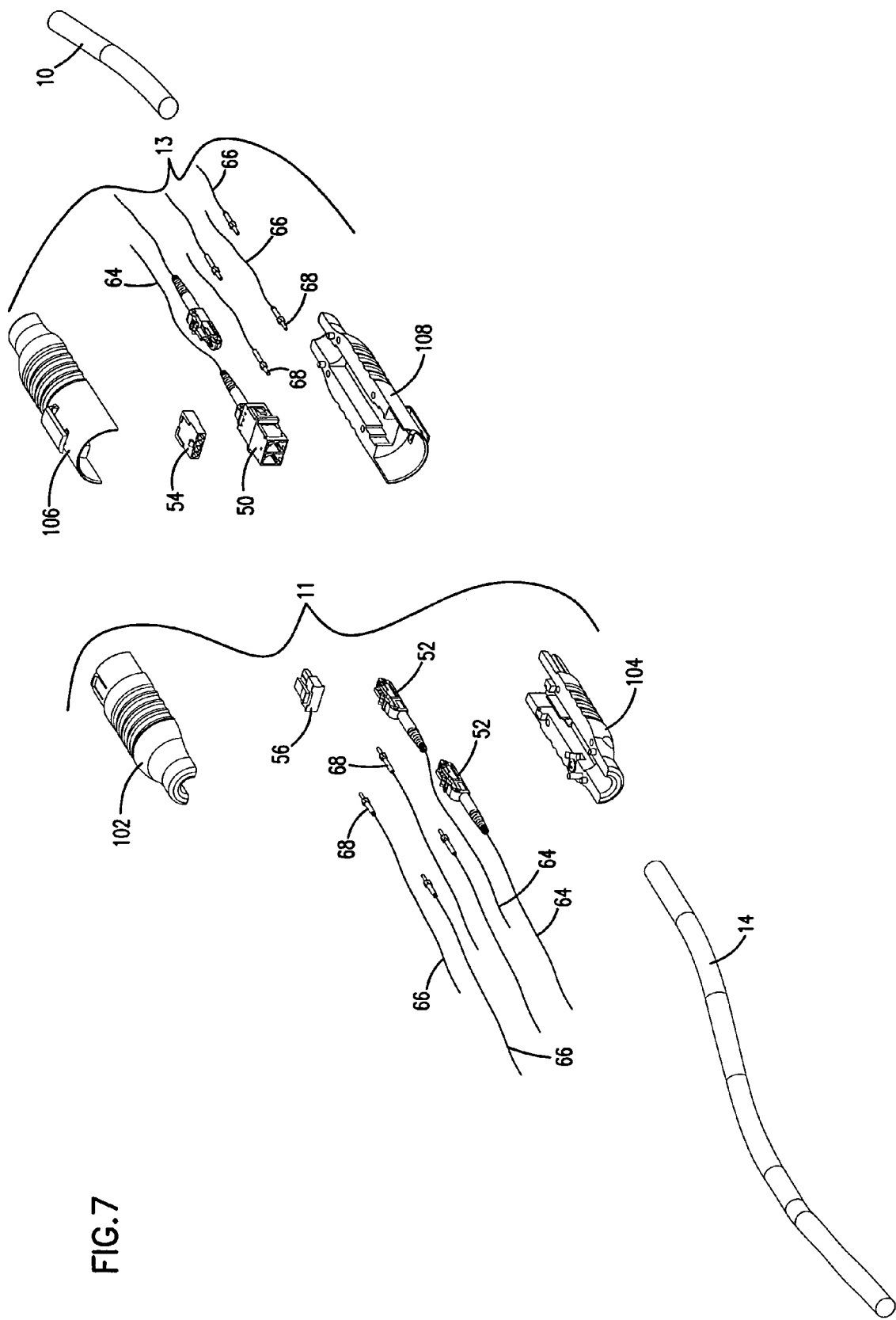
FIG. 7 is an exploded perspective view of the mating pair of connectors as shown in FIG. 5.
Figure 8:
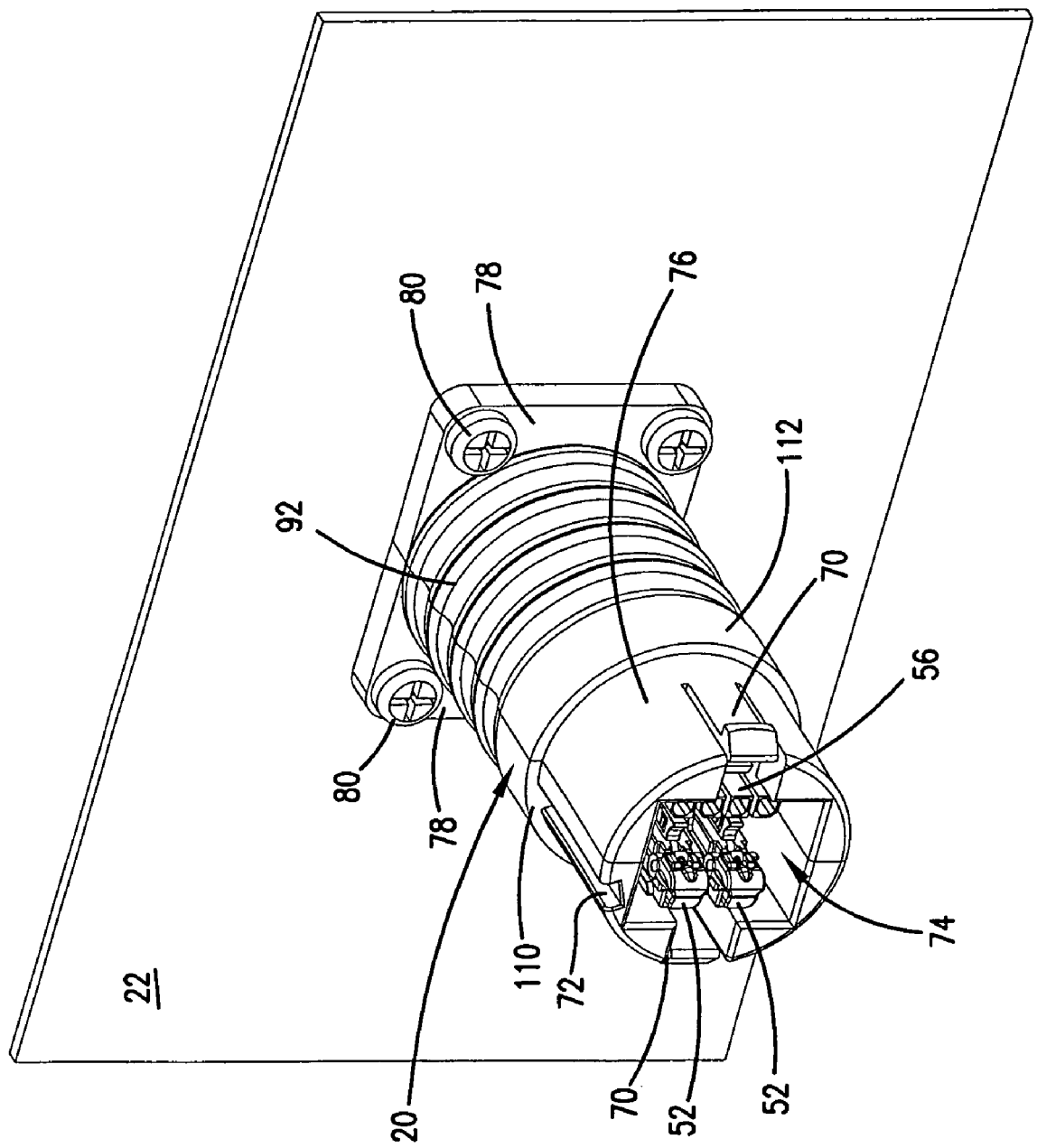
FIG. 8 is a perspective view of a camera bulkhead mount cable connector of FIG. 1.
Figure 9:
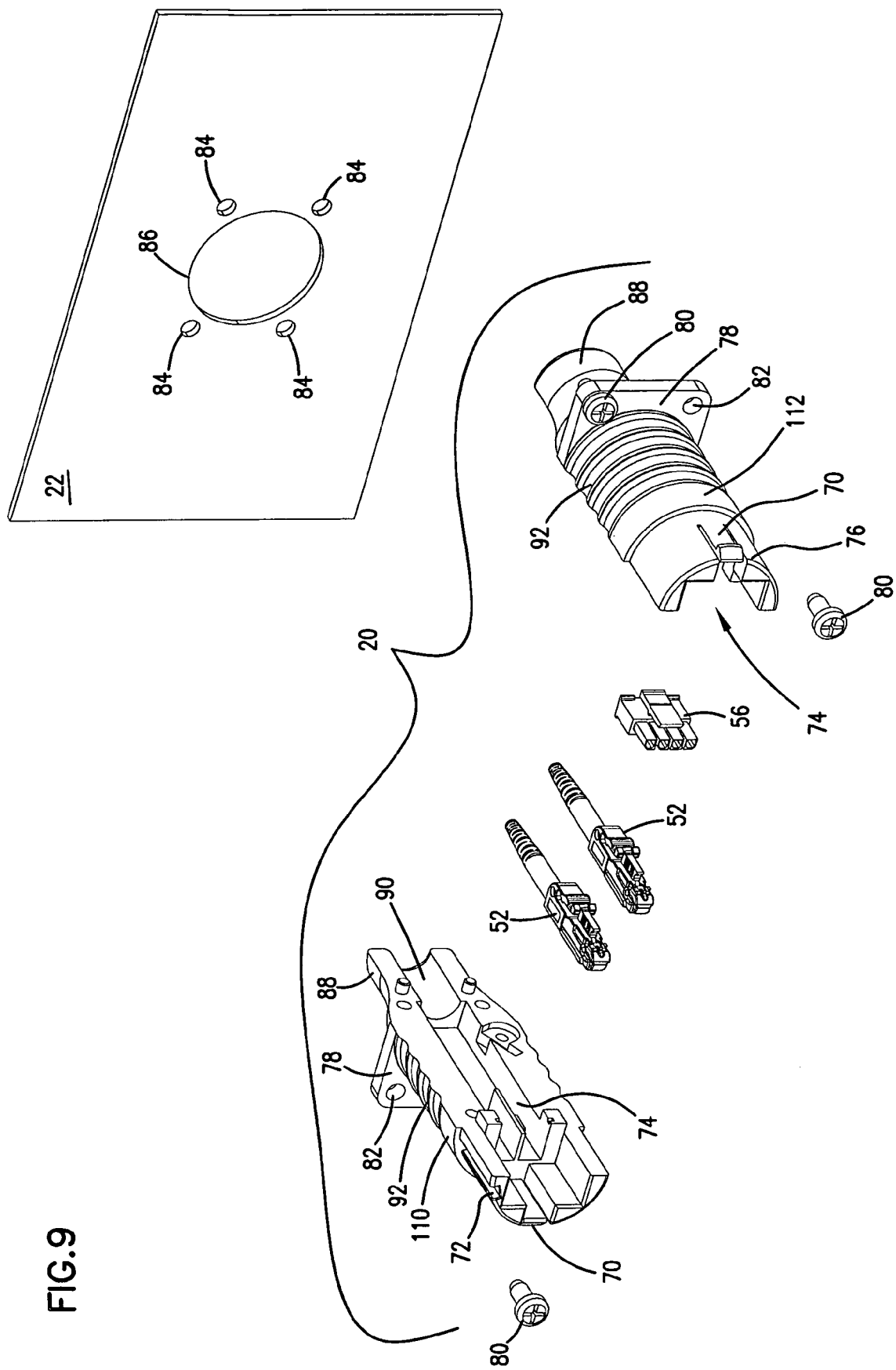
FIG. 9 is an exploded perspective view of the bulkhead mount cable connector of FIG. 8.
Figure 11:
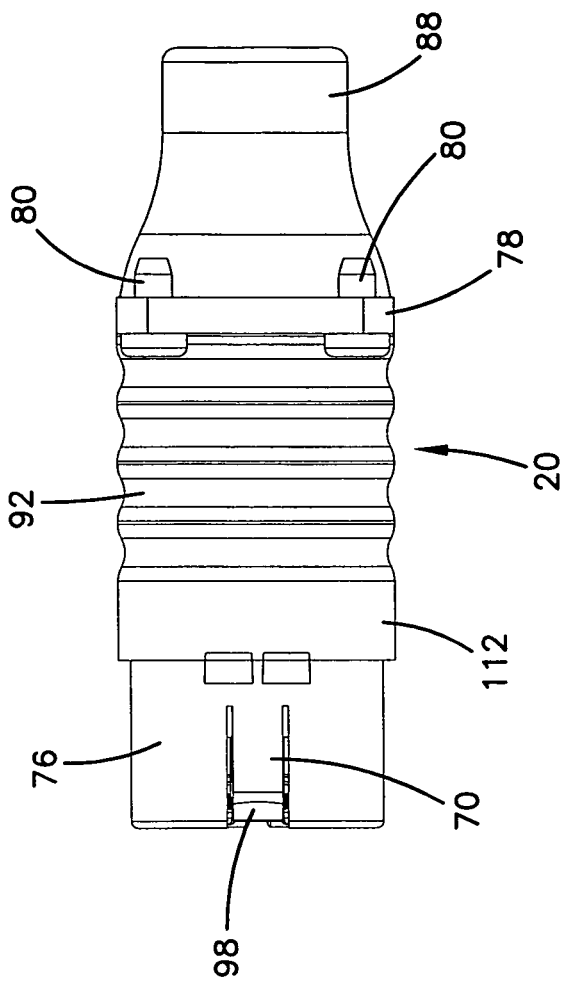
FIG. 11 is a side view of a first mating cable connectors of FIG. 5.
Figure 10:
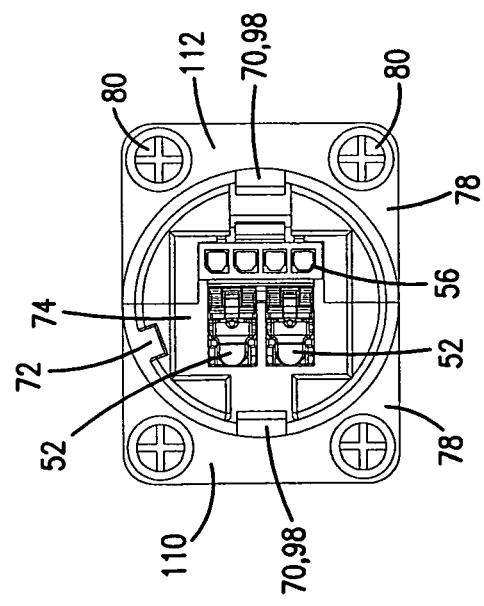
FIG. 10 is an end view of the bulkhead mount cable connector of FIG. 8.

FIG. 7 shows both connectors 11 and 13 including a pair of fiber optic connectors 52 which terminate fiber strands 64 within each cable segment 10 and 14. These connectors are brought together, aligned and optically connected by adapter 50 mounted within connector 13. Each copper conductor 66 may be terminated by a pin contact 68 and these pin contacts 68 may be mounted within mating pin connectors 54 and 56, with pin connector 56 mounted within connector 11 and pin connector 54 mounted within connector 13. Connector 11 includes an outer housing defined by two housing portions 102 and 104. Connector 13 includes an outer housing defined by two housing portions 106 and 108.

Referring now to FIGS. 8 to 11, bulkhead mounted connector 20 includes an outer housing defined by two housing portions 110 and 112. Housing portions 110 and 112 define a central cavity 74 within which two connectors 52 and one pin connector 56 are mounted. Housing portions 110 and 112 also define an outer barrel portion 76 which is sized for insertion within a connector 13. Barrel portion 76 includes a pair of opposing tabs 70 to permit connector 13 to be releasable captured about barrel portion 76, and an alignment feature 72 which engages a mating feature of connector 13 to properly orient connector 13 for mating with connector 20. Each housing portion 110 and 112 includes a mounting flange 78. Openings 82 are defined through flanges 78 for receiving removable fasteners such as screws 80 which engage fastener openings 84 of bulkhead 22. Openings 84 are positioned about an opening 86 in bulkhead 22 which is sized to receive a rear portion 88 of connector 20, opposite barrel portion 76.

Each housing portion 110 and 112 includes a cable receiving end 90 of cavity 74, adjacent rear portion 88. Cables from within the camera or any other equipment, of which bulkhead 22 may form part of the case, enclosure or cabinet, enter into cavity 74 through cable receiving end 90. Additional features of the structure of housing portions 110 and 112 within cavity 74 connector 20 are similar to features of housing portions 102 and 104 of connector 11, shown in FIGS. 16 to 19, below.

Referring now to FIGS. 12 and 13, connector 11 includes the same exterior features as connector 20, with the exception of the flanges 78. Connector 11 is intended for mounting to the end of a freestanding cable, so mounting flanges for mounting to a bulkhead 22 are not necessary. Connector 11 does include an intermediate grip portion 92 to facilitate grasping connector 11 to break a seal 12 between connectors 11 and 13.

FIGS. 14 and 15 show connector 13 including a barrel receiving end 77 within which barrel portion 76 of connector 11 or connector 20 may be received. Barrel receiving end 77 defines an entry into a cavity 75 defined by the housing portions 106 and 108. Adapter 50 and pin connector 54 are mounted within cavity 75. A pair of openings 96 through barrel receiving end 77 are positioned to engage catches 98 of tabs 70 of connector 11 or 20 to releasably hold barrel portion 76 within connector 13. A pair of tab release arms 71 is positioned above openings 96 and each includes a tab release 94. Tab release arms 71 are inwardly deflectable, and when deflected inward, tab releases 94 extend through openings 96 to inwardly deflect tabs 70 from openings 96 so that barrel portion 76 may be removed from barrel receiving portion 77. Inside barrel receiving portion 77 and cavity 75 is an alignment feature 73 which cooperates with alignment feature 72 of barrel portion 76 to align connectors for mating.

When properly aligned by alignment features 72 and 73, connector 13 will mate with either connector 11 or 20 with the fiber connectors 52 aligned to extend into adapter 50 to optically connect fiber strands 64 and pin connectors 54 and 56 aligned to mate and electrically connect copper conductors 66. As shown in FIG. 7, within cavity 75 of connector 13, a pair of fiber connectors 52 terminating fiber strands 64 of cable 14 segment are already positioned in an inner end of adapter 50. When inserted into adapter 50 by mating of connectors 11 and 13, fiber connectors 52 of connector 11 will be optically connected with fiber connectors 52 of connector 13.

Figure 16:
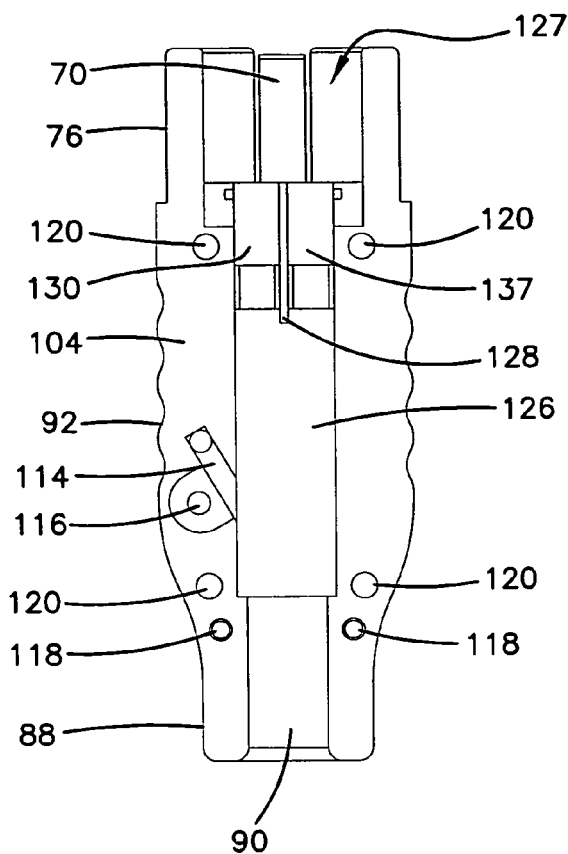
FIG. 16 is an inner side view of a first housing half of the cable connector of FIG. 11.

Referring now to FIGS. 16 to 18, housing portion 104 of connector 11 includes a recess 126 which defines a portion of cavity 74 with a connector opening 127 and cable opening 90 on opposite ends. On one side of recess 126 is a strength member recess 114 and fastener opening 116 for receiving a fastener to clamp strength member 62 of cable 100. A pair of alignment pins extend from an inner face 130 to aid in positioning of housing portions 102 and 104 for joining to form connector 11. A plurality of fastener openings 120 are formed in face for receiving fasteners to join housing portions 102 and 104. Recess 126 includes a longitudinal bulkhead 128 adjacent connector opening 127 which defines a pair of adjacent slots for receiving fiber connectors 52. Alternatively, housing portion 102 could be configured to include a cable clamp mounting arrangement, similar to housing portion 104, described below.

Figure 19:
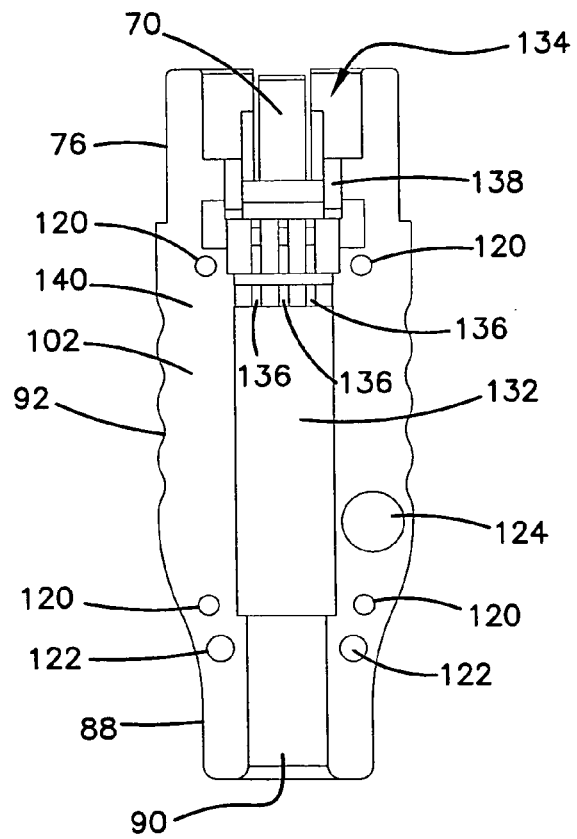
FIG. 19 is an inner side view of a second housing half of the cable connector of FIG. 11.

FIGS. 19 to 21 show housing portion 102 including pin openings 122 positioned to cooperate with alignment pins 118 to align housing portions 102 and 104. Openings 120 are positioned to receive fasteners extending through openings 120 of housing portion 104. A recess 124 is positioned on an inner face 140 to permit a cable clamp to be positioned in recess 114 and opening 116. Strength member 62 of cable 100 can be trimmed to fit within recess 114 and a cable clamp including a fastener such as a screw mounted within opening 116 to secure connector 11 to cable 100. Alternatively, housing portion 102 could not include recess 114 and opening 116 if such an anchor is not required. A recess 132 extends between cable entry 90 and a connector opening 134 on opposite ends. A plurality of fingers 136 extend within recess 132 to organize copper conductors 66 extending from cable 100 to pin connector 56. A pin connector mounting area 138 is defined on the connector opening side of pins 136.

When mounted together as shown in FIGS. 12 and 13, recesses 126 and 132 cooperate to form cavity 74 within connector 11.

Figure 22:
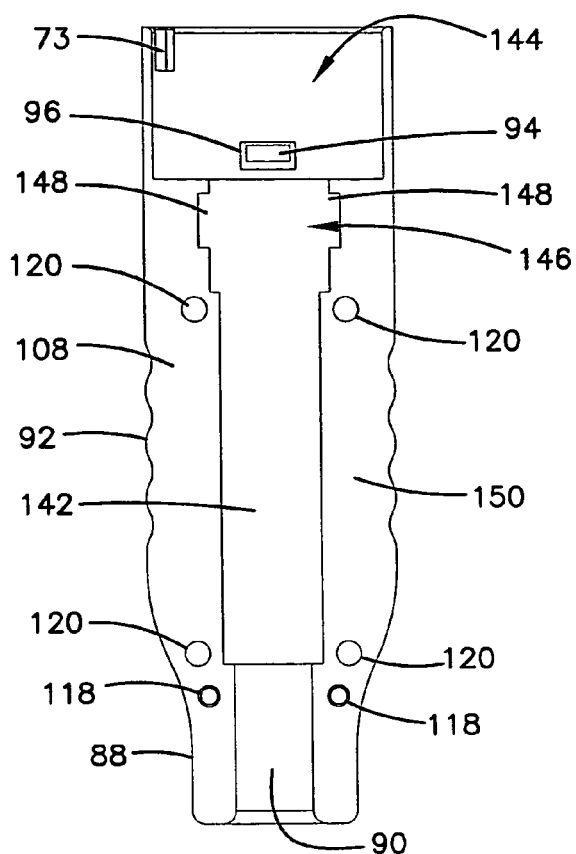
FIG. 22 is an inner side view of a first housing half of the cable connector of FIG. 14.
Figure 23:
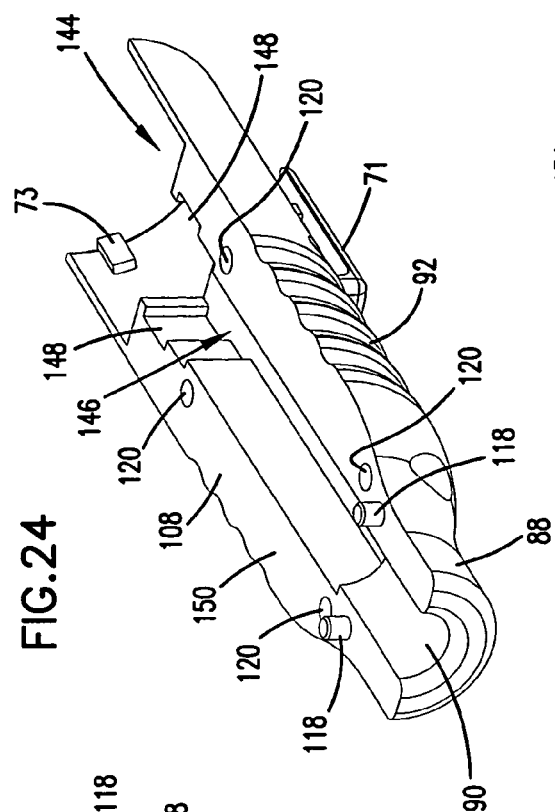
FIG. 23 is a first perspective view of the first housing half of FIG. 22.
Figure 24:
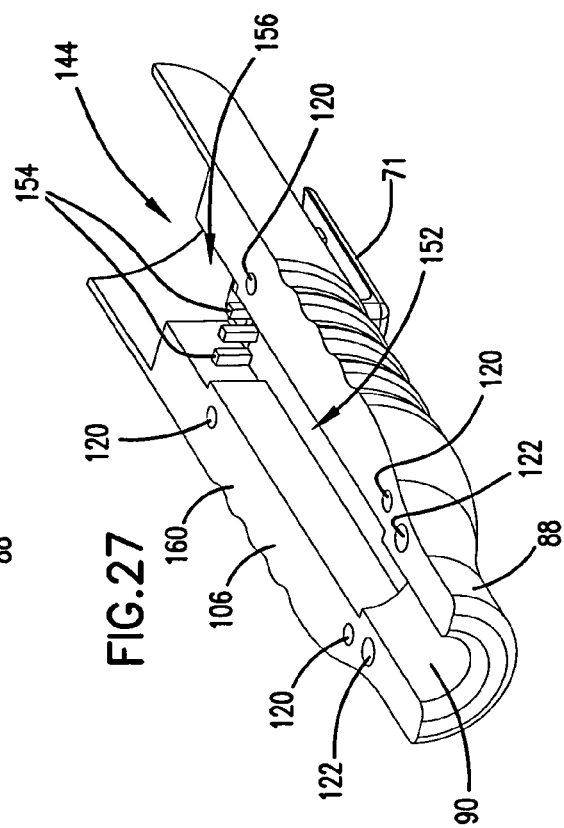
FIG. 24 is a second perspective view of the first housing half of FIG. 22.

FIGS. 22 to 24 show housing portion 108 of connector 13 including a recess 142 extending from a connector receiving opening 144 to cable entry 90 on opposite ends. Within recess 142 is an adapter receiving area 146 adjacent connector receiving opening 144. Adapter receiving area 146 is sized to closely fit about adapter 50 and includes a flange recess 148 on either side to engage a flange of adapter 50 to secure adapter 50 in the desired position within recess 142. Housing portion 108 also includes a pair of alignment pins 118 and a plurality of fastener openings 120 in an inner face 150. Alternatively, housing portion 108 could be configured to include a cable clamp mounting arrangement, similar to recess 114 and opening 116 of housing portion 104, above.

Figure 25:
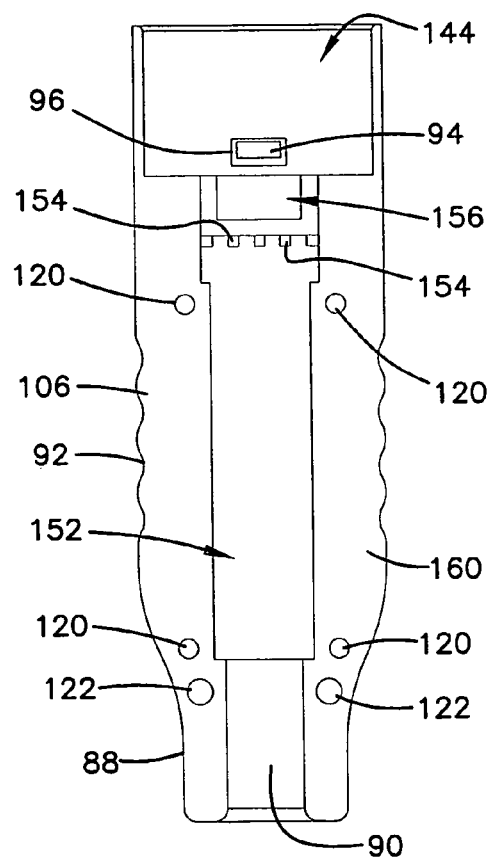
FIG. 25 is an inner side view of a second housing half of the cable connector of FIG. 14.
Figure 26:
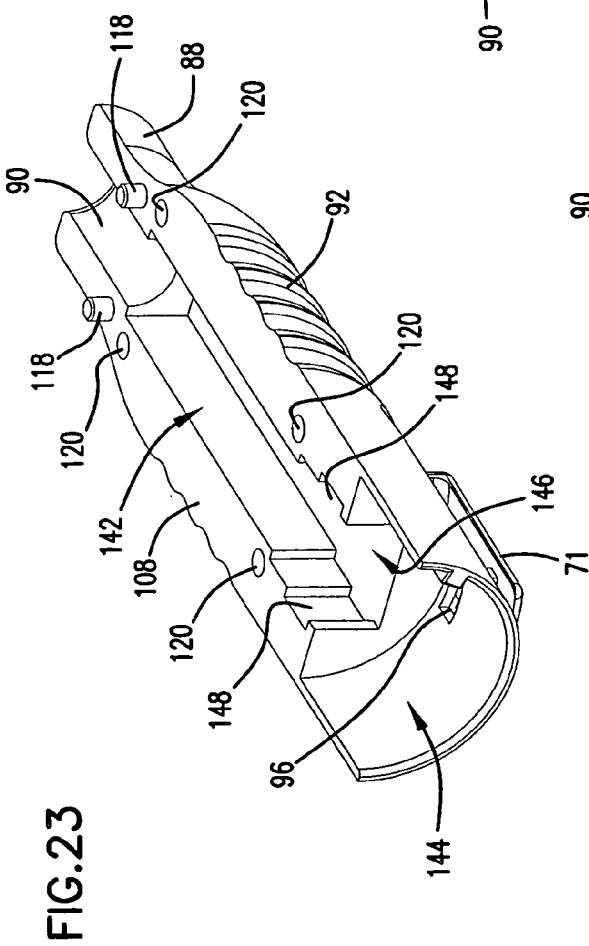
FIG. 26 is a first perspective view of the second housing half of FIG. 25.
Figure 27:
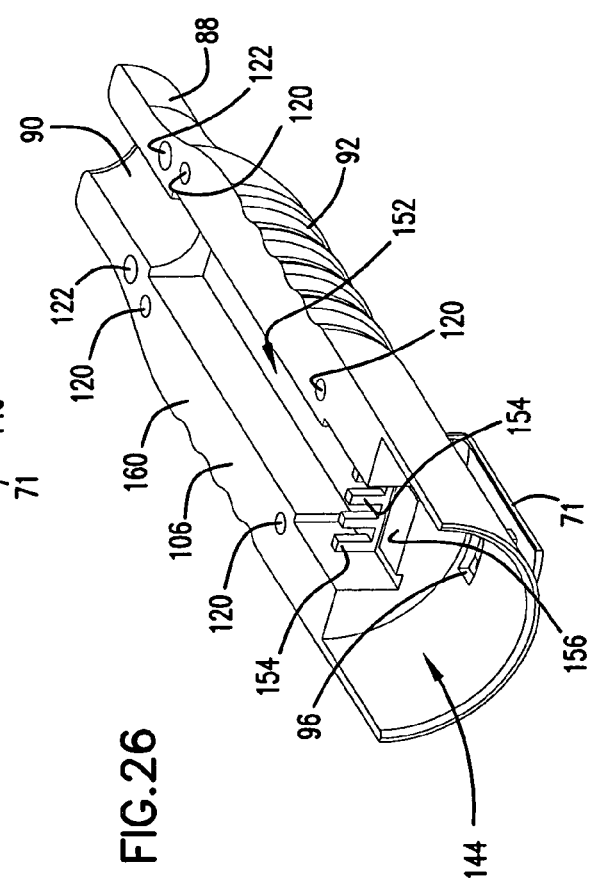
FIG. 27 is a second perspective view of the second housing half of FIG. 25.

FIGS. 25 to 27 show housing portion 106 of connector 13 including a recess 152 extending from connector receiving end 144 to cable entry 90. Within recess 152 are a plurality of fingers 154 and a pin connector mounting area is defined between fingers 154 and connector receiving end 144. Fingers 154 organize and direct copper conductors 66 of cable 100 and serve to correctly position pin connector 54 within connector 13 so that pin connector 54 engages pin connector 56 of mating connector 11. An inner face 160 of housing portion 106 includes a plurality of fastener openings 120 for receiving fasteners extending through openings 120 of housing portion 108 to hold the two housing portions together to form an outer housing of connector 13. Alternatively, housing portion 106 could be configured to include a cable clamp mounting arrangement, similar to recess 114 and opening 116 of housing portion 104, above.

When mounted together as shown in FIGS. 14 and 15, recesses 142 and 152 cooperate to form cavity 75 within connector 13.

It is preferable that both connectors 11 and 13 be constructed with outer housings having two or more portions which are removable to expose the interior cavity of the connectors. It is also preferable that cable entry 90 of connectors 11 and 13, as well as cable fittings 32 of junction box 16 be sized slightly larger than the diameter of outer sheath 60 of cable 100. It is known for one or more elements 64 and 66 within cable 100 in segments 14 or 18 or the connectors terminating these elements (such as fiber connectors 52 and pin connectors 54 and 56) to be damaged, necessitating repair or replacement of assembly 24. While replacement is possible and is the common response to damage, this solution requires a camera operator to carry an entire spare assembly 24. Alternatively, to repair a damaged termination 52, 54 or 56, either connector 11 or 13 of cable segment 14 or 18 extending from junction box 16 could be removed and that cable segment could be reterminated. However, retermination is time consuming and can difficult to accomplish in the field, where the damage is likely to occur while using the camera. Assembly 24 is constructed to permit individual elements 64 or 66 of cable 100 or terminations 52, 54 or 56 of these elements to be quickly replaced in the field by a camera operator with simple tools and does not require that the camera operator carry an extensive array of replacement items.

Figure 28:
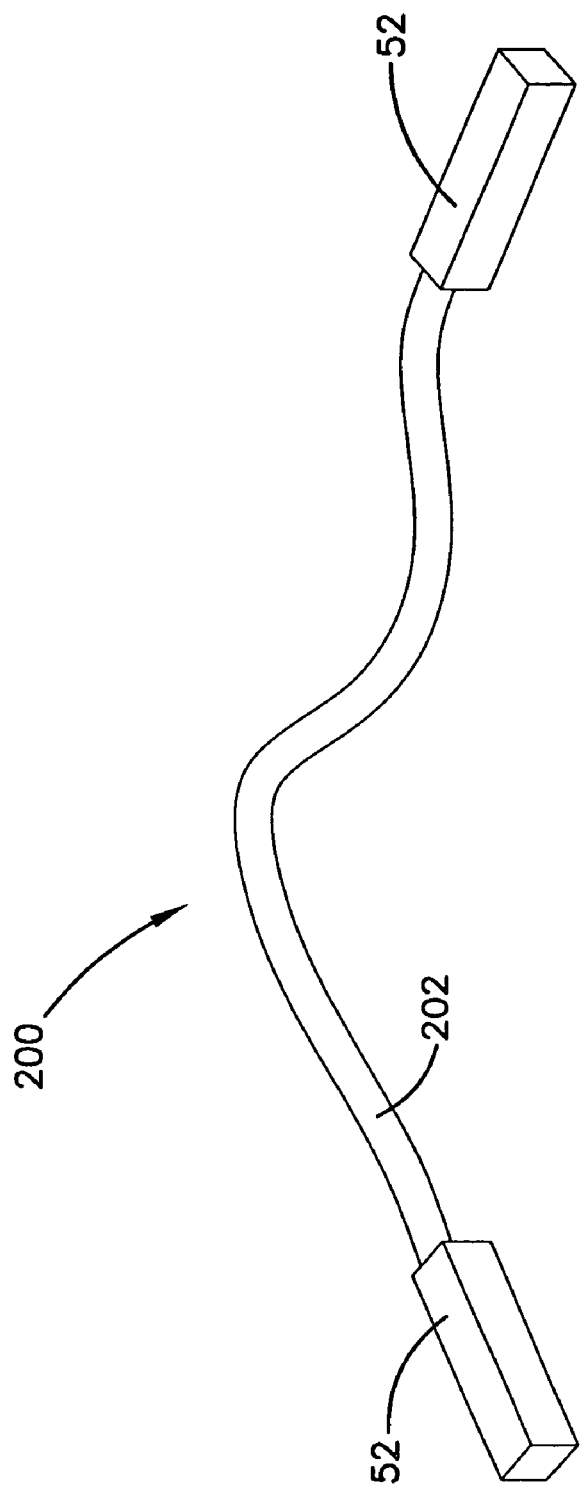
FIG. 28 is a replacement fiber segment for use with the junction box and cable segments of FIG. 1.

If one of the fiber strands 64 within cable 100 in cable segment 18 were damaged, and the camera operator can identify the damaged strand, the camera operator may open junction box 16 by removing cover 34 from main housing 28. With interior 38 exposed, the fiber connector 52 terminating the damaged fiber may be removed from adapter 50 within junction box 16 and moved to one side. Replacement fiber segment 200, as shown in FIG. 28, may include ends terminated with connectors 52. One of these connectors 52 may be inserted within adapter 50 in place of connector 52 of damaged fiber 64. The top half 33 of cable fitting 32 is removed from about cable 100 and a cable length 202 between connectors 52 of replacement fiber 200 extended out of junction box 16 along cable segment 18. As shown, cable length 202 of replacement fiber segment 200 includes a jacketed fiber optic cable such as a standard 2 to 3 millimeter fiber cable. As this cable length 202 is intended primarily as a temporary field repair, and will be extended along and supported by one of the cable segments 14 or 18, additional reinforcing structure other than typical jacketing should not be required. Of course, more heavily protected cable jackets and other reinforcing structures within cable length 202 may be used as convenient or desirable, based on the conditions to which assembly 24 may be subject to or based on the repair materials that may readily available to the camera operator.

Replacement fiber segment 200 is extended along cable segment 18 to connector 13. Connector 13 is removed from bulkhead connector 20 and fasteners holding housing portions 106 and 108 together are removed. Housing portions 106 and 108 are separated from each other permitting access into recess 142 of housing portion 108. Within recess 142, fiber connector 52 terminating the damaged fiber strand 64 is removed from adapter 50. This fiber connector 52 is removed from recess 142 to provide room for connector 52 terminating an end of replacement fiber 200. This connector 52 of replacement fiber 200 is inserted within adapter 50 in place of the removed damaged connector 52 of cable segment 18. Cable length 202 is extended from adapter 50 within recess 142 out of cable entry 90 and housing portions 106 and 108 are refastened together.

The damaged fiber strand 64 of cable 100 of cable segment 18 has been replaced with replacement fiber 200 and the camera operator can continue operating the camera.

A similar process is followed to replace a damaged copper conductor or damaged pin connector. In either replacement scenario, the replacement fiber or copper is extended out of junction box 16 and cavity 74 along cable segment 18. This replacement fiber is copper may be attached to cable segment 18 to provide support or additional protection to the replacement.

Figure 29:
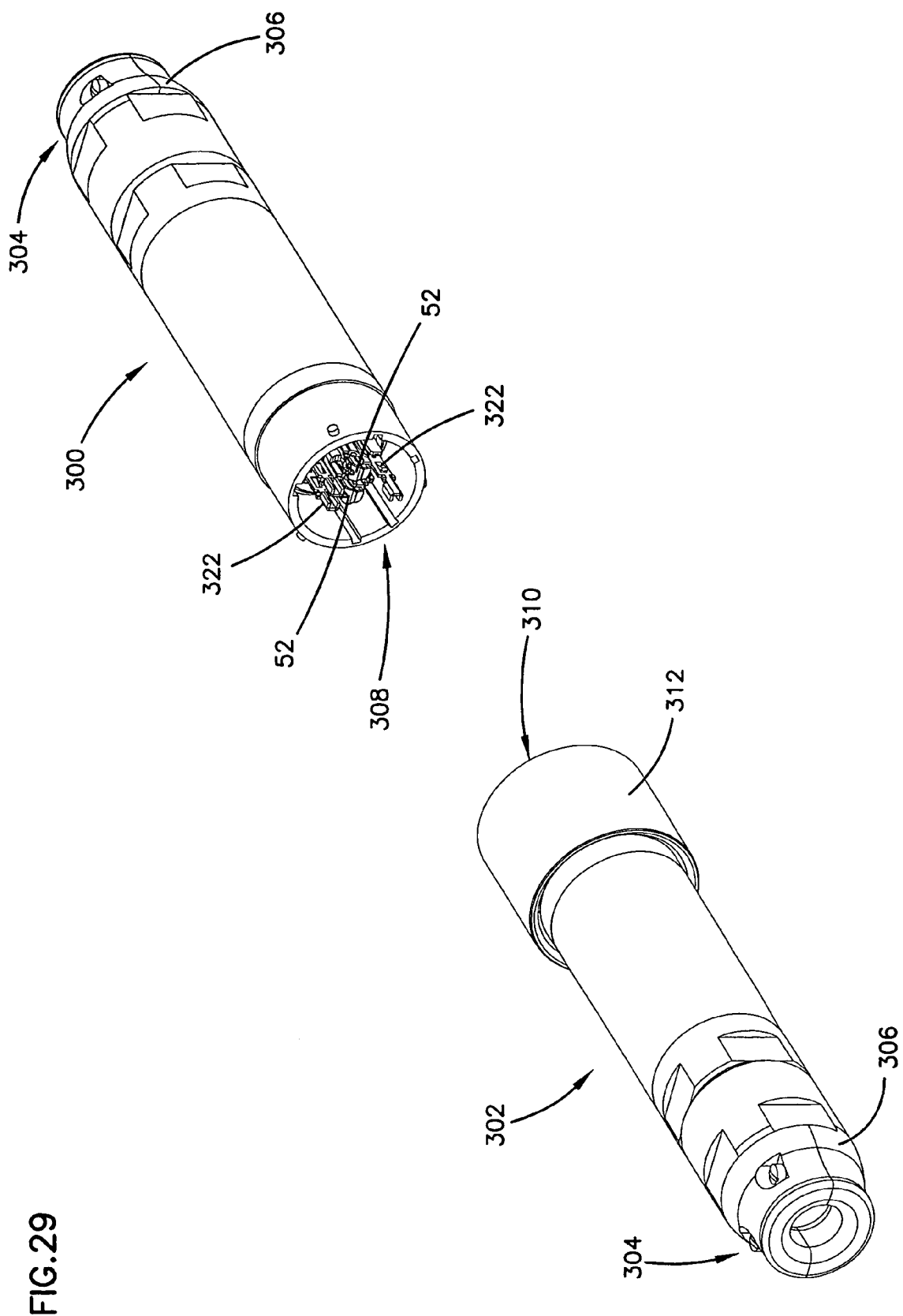
FIG. 29 is a perspective view of a pair of alternative embodiment mating hybrid fiber/copper cable connectors according to the present invention.
Figure 30:
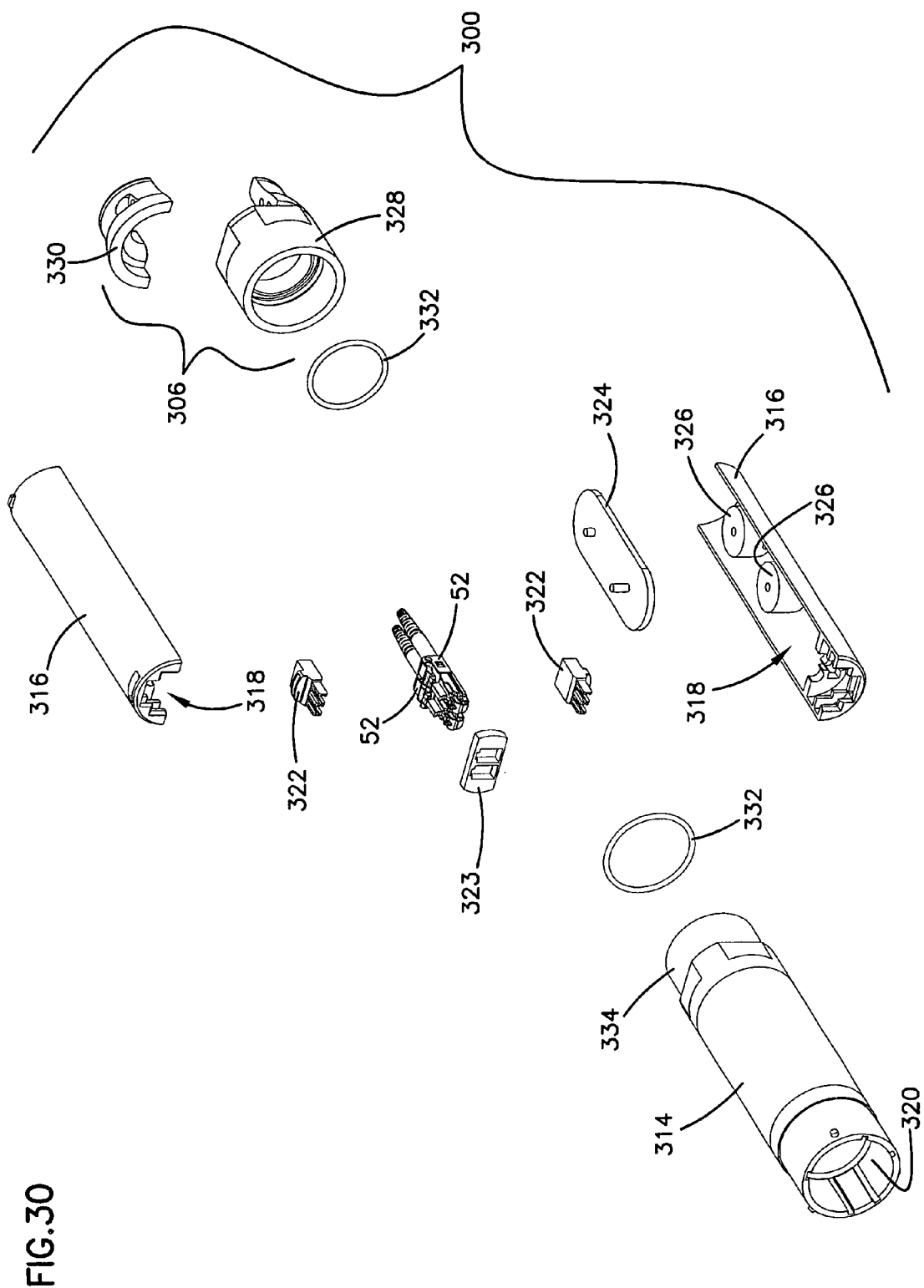
FIG. 30 is an exploded perspective view of one of the cable connectors of FIG. 29.
Figure 31:
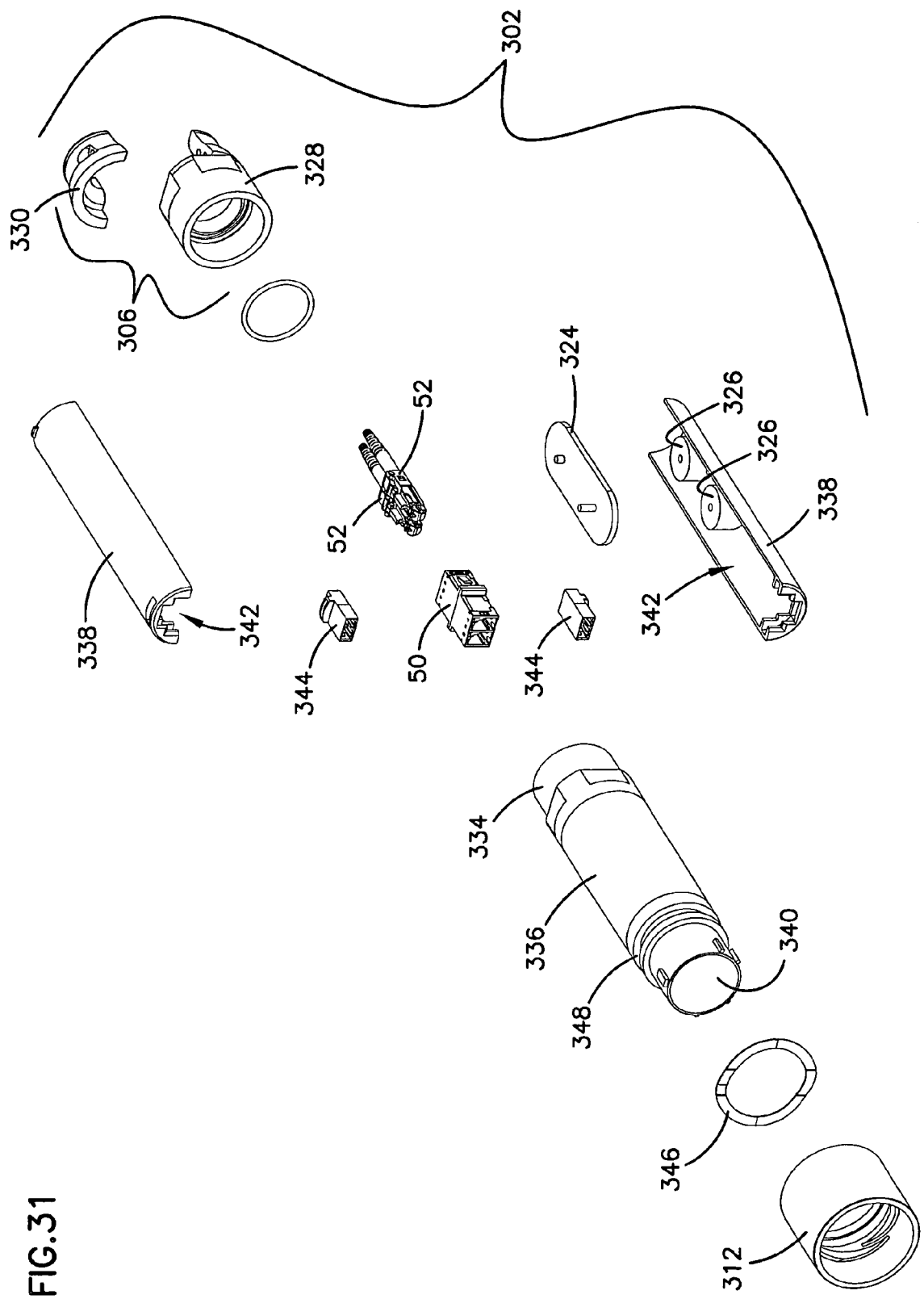
FIG. 31 is an exploded perspective view of the other cable connector of FIG. 29.

Referring now to FIGS. 29 to 31, alternative embodiments of hybrid fiber/copper cable connectors 300 and 302 may be mounted to the ends of cable segments 14 and 18 in place of connectors 11 and 13. Each connector 300 and 302 includes a cable receiving end 304 with a cable clamp 306 through which one of the cable segments might extend. Connector 300 has a mating end 308 opposite cable receiving end 304 which defines a female or socket connector end. Connector 302 has a mating end 310 opposite cable receiving end 304 which defines a male or plug connector end configured to mate with end 308 of connector 300. A locking ring 312 is rotatably mounted about cable mating end 308, 310 to releasably lock the two connectors to each other (as shown below in FIGS. 32 and 33).

Referring now to FIG. 30, connector 300 is shown in further detail. An outer housing 314 includes an interior 320 within which is positioned a pair of inner housing halves 316. Inner housing halves 316 cooperate to define an inner housing within an interior 318. Within interior 318 are positioned a pair of fiber optic connectors 52, which may terminate ends of optical fiber within cable 11 or cable 13. A connector retainer 324 cooperates with bulkheads within interior 318 to position and hold fiber connectors 52 adjacent mating end 308. Positioned on opposite sides of fiber connectors 52 is a pair of electrical pin jack housings 322. Pin jack housings 322 are also accessible through mating end 308 and may provide a termination for electrical conductors within cable 11 or cable 13. A cable retainer 324 cooperates with a cable management structures 326 within interior 318 to provide cable management and cable slack storage for either fibers or electrical conductors extending through cable receiving end 304. At cable receiving end 304, cable clamp mounts about an end 334 of outer housing 314 and includes a first portion 328 and a second portion 330. A pair of o-rings or similar items 332 may also be included in connector 300 to provide improved seals between the various components.

Referring now to FIG. 31, connector 302 includes an inner housing 336 defining an interior 340 within which may be positioned a pair of inner housing halves 338. Housing halves 338 cooperate to define an inner housing with an interior 342. Positioned within interior 342 are a fiber optic adapter 50 and a pair of fiber optic connectors 52, which may terminate ends of optical fiber within cable 11 or cable 13. As is well known in the telecommunications industry, connectors 52 may be inserted within opposite ends adapter 50 to optically connect fibers terminated within connectors 52. Positioned on opposite sides of fiber adapter 50 is a pair of electrical pin jack housings 344. Pin jacks 344 are also accessible through mating end 308 and may provide a termination for electrical conductors within cable 14 or cable 18. Pin jack housings 322 and 344 are configured to mate with each other and electrically connect electrical conductors terminated within pin jack housings 322 and 344.

Interior 342 also includes cable management structures 326 and cable retainer 324 to aid the management and storage of cables within interior 342. Cable clamp 306 is mounted to end 334 of outer housing 336. Locking ring 312 may mounted to an opposite end of outer housing 336 by cooperation of a washer 346 received rotatably within a recess 348.

FIGS. 32 and 33 show connectors 300 and 302 mated together at mating ends 308 and 310, respectively. Fiber connectors 52 of connector 300 are received within adapter 50 and optically mated with fiber connectors 52 of connector 302. Pin jack housings 322 of connector 300 position pins 68 of wires 66 so that they are mated with and electrically connected to pins 68 and wires 66 held within pin jack housings 344 of connector 302. Locking ring 312 has been rotated and advanced along an outer surface of mating end 308 and engaged features on that outer surface to hold connector 300 to connector 302.

A hybrid fiber/copper cable, such as cable segment 14 or 18, would extend into either of interior 318 or 342 through an opening 350 in cable receiving end 304. Fibers 64 and electrical conductors or wires 66 are separated from within the hybrid cable 10 and extend from cable receiving end 304 toward mating ends 308 and 310. If necessary, any or all of fibers 64 or wires 66 may be directed about cable management structures 326 before reaching a termination at either fiber connector 52 or pin jack housings 322 or 344.

As noted above, sometimes an element (fiber 64 or wire 66) of cable segment 14 or 18 needs to be replaced due to damage, a short, or some other failure to transmit a signal. If the replacement element, such as the fiber segment 200 described above, is the same length as cable segment 14, there is no need to direct the replacement fiber 200 about cable management structures 326 to store excess slack. However, cable segment 14 may have been previously reterminated and now is a shorter length than originally contemplated when replacement fiber segment 200 was produced. In this case, cable management structures 326 and cable retainer 324 may be used to store excess slack so that replacement segment 200 may be closely matched in length to cable segment 14.

Cable management structures 326 may also be used when terminating any of the various hybrid cable segments shown in FIG. 1. In circumstances when the fibers 64 or wires 66 extending from the cable segment for termination are of different lengths, cable management structures 326 may be used to provide storage of the excess length of the longer elements so that all elements are an appropriate length. This will ensure that all terminations are correctly positioned within the connector 300 or 302 and that no undesirable bending or kinking of the elements occurs within interior 318 or 342, respectively.

FIGS. 34 to 39 show outer housing 314 of connector 300 with a second end 352 opposite cable clamp end 334. Second end 352 defines a portion of mating end 308 and includes at least one pin 362 extending from an outer surface and at least one key slot 364 on an inner wall 360 of interior 320. Pins 362 provide a locking engagement with locking ring 312 of connector 302. Key slots 364 aid in orientation of the two connectors 300 and 302 for proper engagement of fiber connectors 52 with adapter 50 and pin jacks 322 with pin jacks 344. A central portion 354 of outer housing 314 may be knurled or otherwise provided with a slip resistant surface to aid in handling of connector 300.

Adjacent cable clamp end 334 is a wrench flat portion 356 with a plurality of opposing wrench flats to aid the assembly of cable clamp 306 to outer housing 314 and connector 300. As shown on FIG. 36, cable clamp end 334 may be threaded to receive and engage cable clamp portion 328. Within interior 320 on inner wall 360 adjacent cable clamp end 334 are one or more recesses 366 which engage a tab of one of the inner housing halves 338 to orient the inner and outer housings with respect to each other and to prevent rotation of the inner and outer housings with respect to each other. Formed in inner wall 360 within interior 320 is an o-ring groove 368 for receiving o-ring 332.

FIGS. 40 to 44 show outer housing 336 of connector 302 with a second end 370 opposite clamp end 334. Second end 370 defines a portion of mating end 310 and includes a plurality of keys 372 extending from an outer surface. Keys 372 are arranged to cooperate with key slots 364 of outer housing 314 to uniquely orient connectors 300 and 302 for proper mating of mating ends 308 and 310. Interior 340 includes an inner wall 374 in which are formed recesses 366 adjacent cable clamp end 334. Cable clamp end 334 includes wrench flat portion 356 with wrench flats 358. Recess 348 is formed between central portion 354 and second end 370 to receive washer 346.

Figure 45:
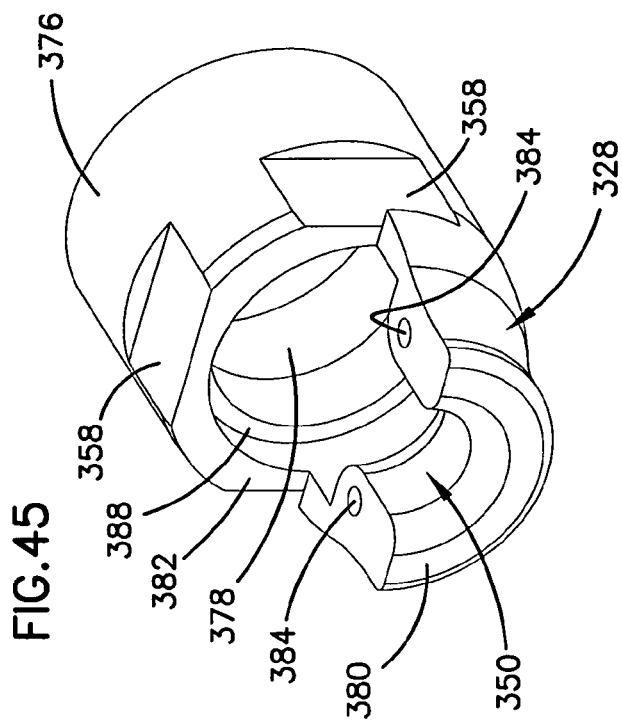
FIG. 45 is a perspective view of a first portion of a cable clamp for use with the cable connectors of FIGS. 29 to 31.
Figure 47:
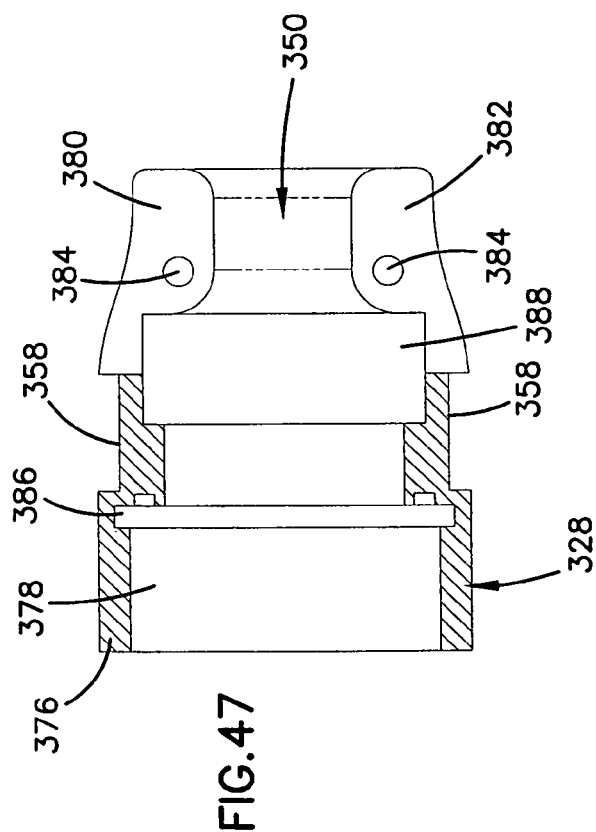
FIG. 47 is a top cross-sectional view of the cable clamp portion of FIG. 45.
Figure 46:
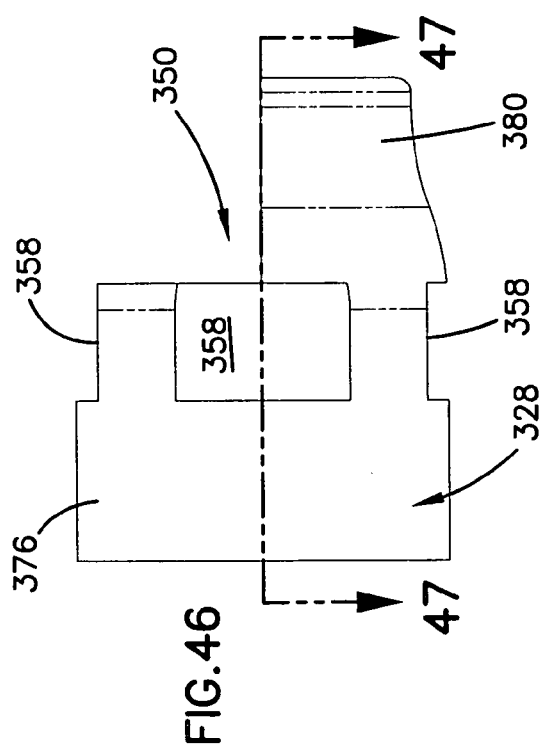
FIG. 46 is a side view of the cable clamp portion of FIG. 45.

Referring now to FIGS. 45 to 47, first portion 328 of cable clamp 306 includes a ring portion 376 that extends continuously about cable receiving opening 350. On an inner wall 378 within ring portion 376 are threads for engaging cable clamp end 334 of housings 314 and 336. Formed on an exterior surface of first portion 328 are wrench flats 358 to aid in assembly of connectors 300 and 302. Opposite ring portion 376 is an outer end 380 with a relieved section 382 so that outer end 380 is not generally continuous about opening 350. Relieved section 382 receives second portion 330 to clamp about a hybrid cable such as cable 14 or 18. A pair of fastener openings 384 are included within relieved section 382 to receive fasteners mounting second portion 330 to first portion 328 and tightly about the cable extending through opening 350. Positioned within opening 350 and at least partially within relieved section 382, is a circumferential recess 388 for receiving a collar or other similar device which fits about the cable within opening 350. The collar will permit variations in an outer diameter of the cable to be accounted for to ensure that cable clamp 306 engages the cable tightly. Also within opening 350 and adjacent inner threaded wall 378 is an o-ring recess 386 for receiving an o-ring when connector 302 is assembled.

FIGS. 48 to 52 illustrate second portion 330 of cable clamp 306 which fits within relieved section 382 of first portion 328. Second portion 330 also forms part of opening 350 and cooperates with first portion 328 to completely define cable receiving opening 350 into interior 318 or 340. A recess 390 on an inner wall of second portion 330 cooperates with recess 388 to define a generally continuous collar receiving recess for a cable collar positioned about cable 14 or 18. On an exterior surface 396 is a pair of fastener recesses 392 and fastener openings 394. Fasteners such as screws or other removable fasteners may extend through opening 394 and engage openings 384 of first portion 328 to engage a cable within opening 350. Recesses 392 provide a uniform and generally perpendicular surface for the fasteners to engage.

Referring now to FIGS. 53 to 55, inner housing half 338 of connector 302 includes an outer surface 398, a first end 400 which is positioned adjacent mating end 310 of connector 302 and a second end 402 positioned adjacent cable clamp end 334 of connector 302. On outer surface 398 is a tab 404 engages recess 366 within interior 340 of outer housing 336. As shown by dashed lines in FIG. 54, a loop 365 of fiber 64 (or wire 66) may extend about one or both of cable management structures 326 within interior 342 to provide slack storage of excess cable length and to provide bend radius protection to cable within loop 365. Adjacent first end 400 is a slot 406 sized and configured to engage a mounting flange of adapter 50 so that adapter 50 may be securely held within interior 318 of connector 302.

A pair of bulkheads 408 define slot 406 and define an opening in first end 400 to permit adapter 50 to extend from interior 342 at mating end 310. Bulkheads 408 also define an opening 410 for pin jack housings 344 to extend through from interior 342 toward mating end 310. Slot 406 also extends through pin jack opening 410 and engages a mounting flange of pin jack housings 344. Outer surface 398 is closely engaged by inner wall 374 of interior 340 of outer housing 336. The close engagement of outer surface 398 and inner wall 374 ensures that adapter 50 and pin jack housings 344 are held securely in the desired locations within interior 342 so that they can be aligned with and engage mating features of connector 300.

Referring now to FIGS. 56 to 58, inner housing half 316 of connector 300 includes a first end 412 which is positioned adjacent mating end 308 of connector 300 and a second end 414 which is positioned adjacent cable clamp end 334 of connector 300. Housing half also includes outer surface 398 and alignment tab 404 adjacent second end 414. Within interior 318 adjacent first end 412, a slot 416 is defined by a pair of bulkheads 418. Slot 416 is sized and configured to receive connector retainer 323 that fits about fiber connectors 52. Connector retainer 323 positions and holds connectors within mating end 308. An additional interior bulkhead 420 provides a stop engaging an inner edge of fiber connectors 52 and holding connectors 52 in position to engage and mate within adapter 50 of connector 302. Bulkheads 418 and 420 also define an opening 422 to permit pin jack housing 322 to extend from interior 318 toward mating end 308. Slot 416 extends through opening 422 to engage a mounting flange of pin jack housing 322. Cable management structures 326 within interior 318 include openings 325 to receive a pin of cable retainer 324 between two inner housing halves 316, as shown in FIGS. 32 and 33.

Figure 59:
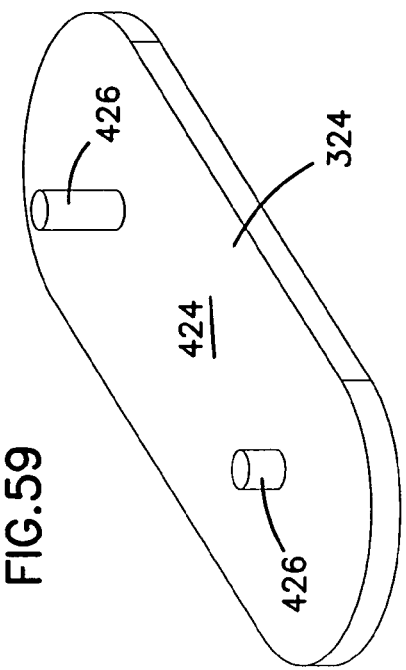
FIG. 59 is a perspective view of a fiber retainer for use with the connectors of FIGS. 30 and 31.
Figure 60:
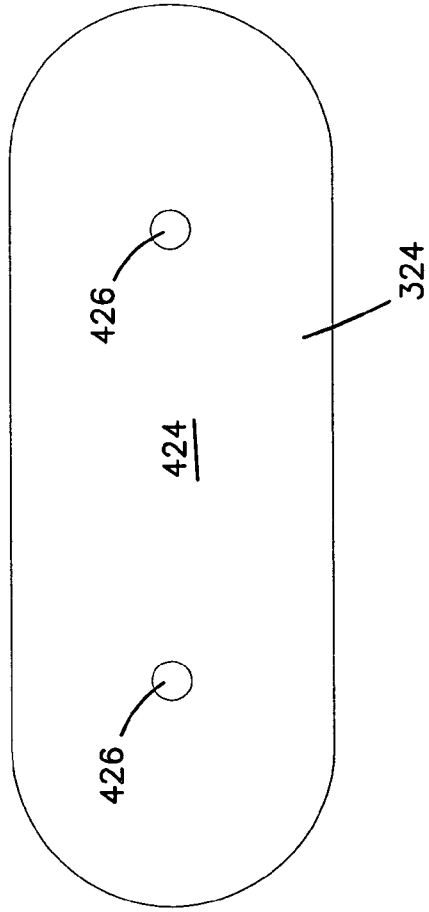
FIG. 60 is a top view of the fiber retainer of FIG. 59.
Figure 61:
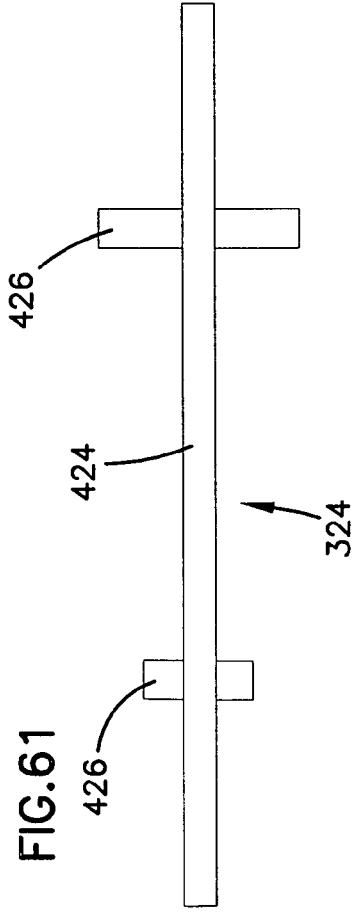
FIG. 61 is a side view of the fiber retainer of FIG. 59.
Figure 66:
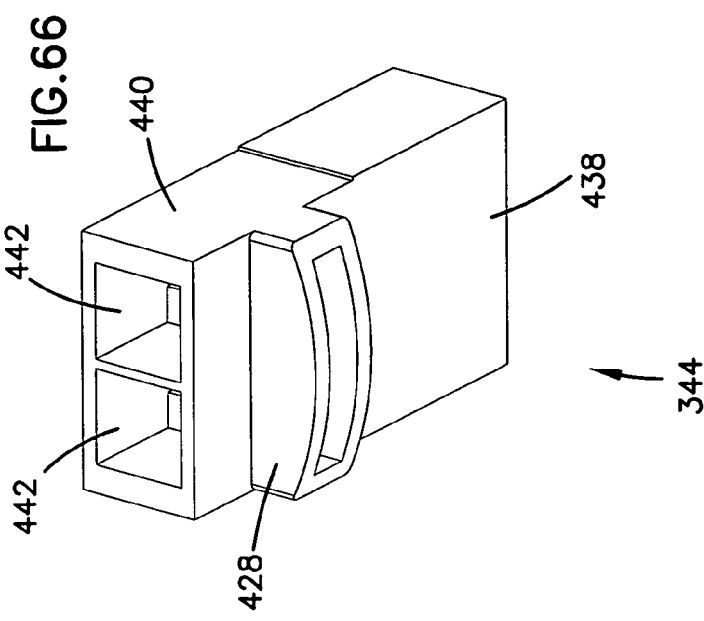
FIG. 66 is a perspective of second electrical pin connector for use with the connectors of FIG. 31.
Figure 69:
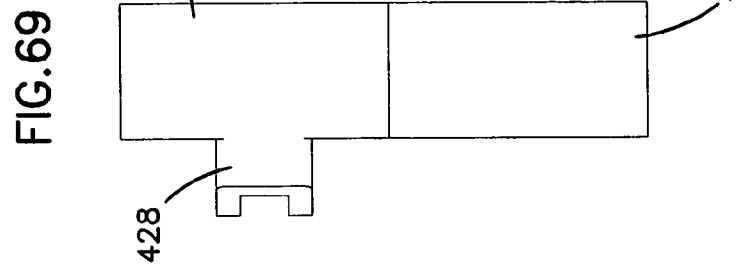
FIG. 69 is a second side view of the electrical connector of FIG. 66.
Figure 68:
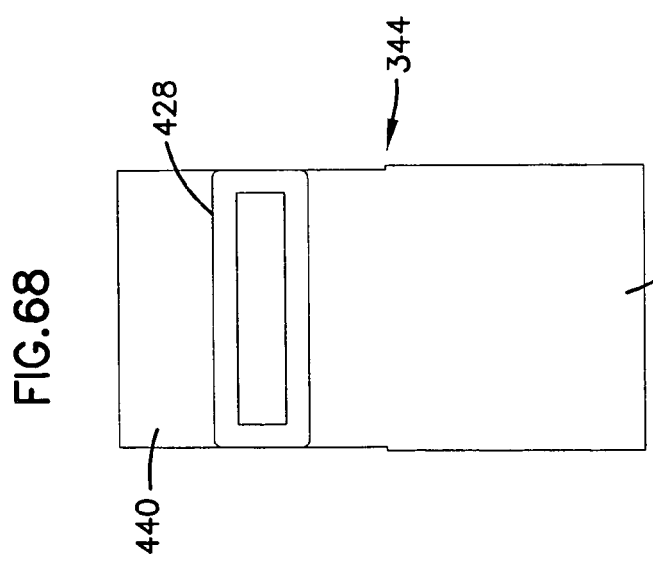
FIG. 68 is a first side view of the electrical pin connector of FIG. 66.
Figure 67:
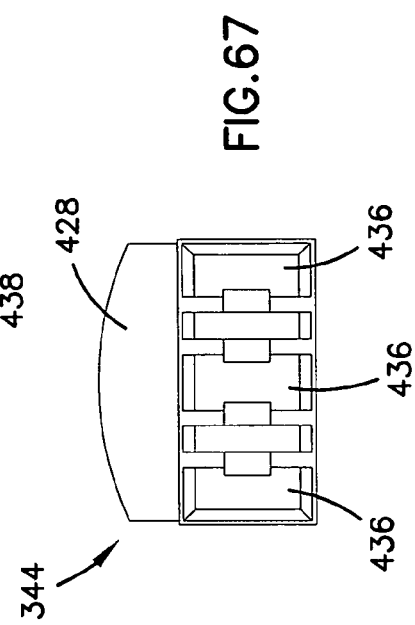
FIG. 67 is an end view of the electrical pin connector of FIG. 66.

Cable retainer 324 is shown in FIGS. 59 to 61 and includes a central plate 424 ad a pair of pins 426 extending on both sides of plate 424. Pins 426 are received within openings 325 of cable management structures 326 to position and hold cable retainer within interior 318 or 342. Pins 424 may be of different lengths, as shown, which may assist in the assembly of connectors 300 and 302, or may generally the same length. When assembled as shown in FIGS. 32 and 33, plate 424 will block off a portion of interior 318 of each inner housing half 316 (or interior 342 of each inner housing half 336) to retain fiber or wires about cable management structures 326.

FIGS. 62 to 65 illustrate male pin jack housing 322 with a mounting tab 428 which engages slot 416 within inner housing half 316. A plurality of pin supports 430 extend from one end of a body 432 and provide support for pins 68 terminating wires 66. At an opposite end of body 432 are channels 434 for receiving wires 66. Pin supports 430 are received within mating support recesses 436 in an end 438 of a body 440 of female pin jack housing 344, shown in FIGS. 66 to 69. Pin jack housing 344 includes mounting tab 428 to be received within slot 406 of inner housing half 338. In an end of body 440 opposite end 438 are channels 442 for receiving wires 66.

Figure 70:
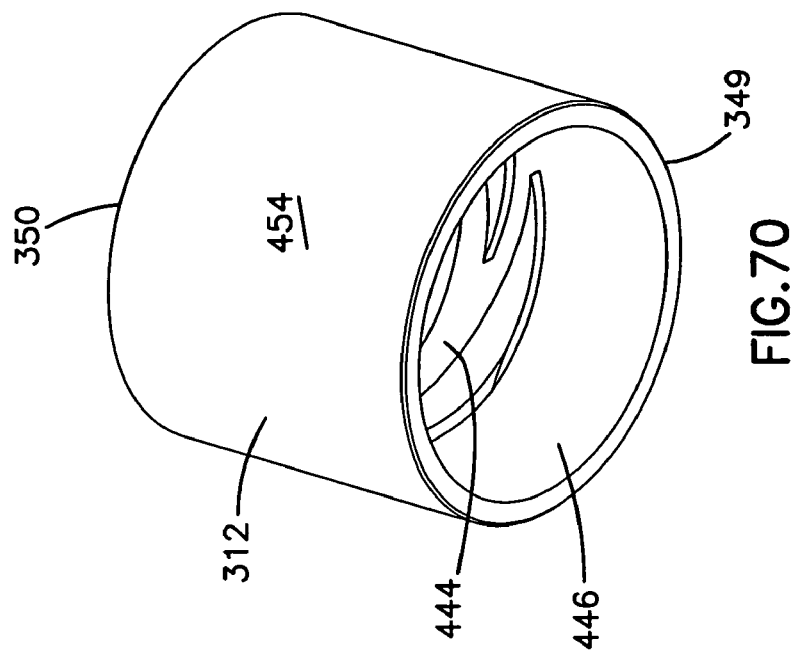
FIG. 70 is a perspective view of a locking ring for use with the connector of FIG. 31.
Figure 72:
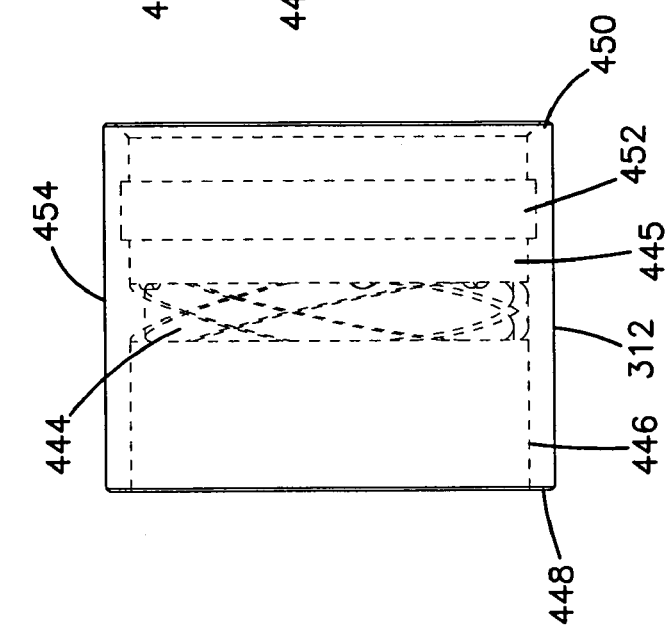
FIG. 72 is a side view of the locking ring of FIG. 70, with internal features shown in dashed lines.
Figure 71:
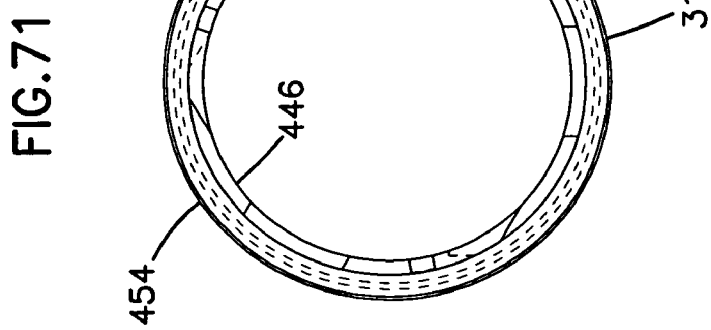
FIG. 71 is an end view of the locking ring of FIG. 70.

Referring now to FIGS. 70 to 72, locking ring 312 includes an exterior surface 454 which may be knurled or otherwise textured to provide secure grip. Within locking ring 312, on an inner wall 446 are a plurality of angled channels 444 for receiving and engaging pins 362 of connector 300 to releasably hold connectors 300 and 302 together. When mating ends 308 and 310 of connectors 300 and 302 begin to engage each other, an end 448 of locking ring 312 extends over second end 352 until each pin 362 is positioned within a channel 444. Locking ring 312 is then rotated to draw pins 362 deeper within channels 444 until pins 362 are received within a pin channel 445. Washer 346 is received within a groove 452 in inner wall 446 adjacent an opposite end 450 of locking ring 312. The engagement of washer 346 by both groove 452 and recess 348 permit some longitudinal movement of locking ring 312 along connector 302 while securing locking ring 312 to connector 302.

Connector retainer 323 is shown in FIGS. 73 to 75, and includes a pair of side extensions 454 which extend to engage slots 416 of inner housing halves 316. A top 456 and a bottom 457 may rest against pin jack housings 322 within connector 300 to ensure that mounting tabs 428 remain engaged with slot 416. (Similarly, within connector 302, adapter 50 may rest against pin jack housing 344 to ensure that mounting tabs 428 remain engaged with slots 406.) A pair of openings 458 extends through retainer 323 and are sized and configured to receive fiber connectors 52. A portion 460 of openings 458 is provided to engage a locking or retention mechanism of connector 52. While opening 458 and portion 460 are shown to engage one format of fiber optic connector, openings 458 may be modified as needed to fit the fiber optic connector used.

The above specification, examples and data provide a complete description of the manufacture and use of the invention. Since many embodiments of the invention can be made without departing from the spirit and scope of the invention, the invention resides in the claims hereinafter appended.

What is claimed is:

1. A hybrid fiber and electrical cable connector comprising:
    a housing with a mating end and a cable entry end, the housing defining a longitudinal axis extending from the mating end to the cable entry end, the housing formed from two housing portions removably mounted together to form an interior with an opening extending from the mating end to the cable entry end, the two housing portions removably mounted with respect to each other in a direction generally perpendicular to the longitudinal axis of the housing;
    at least one fiber optic connector mounted within the interior adjacent the mating end and at least one electrical pin connector mounted within the interior adjacent the mating end, the fiber optic connector being removably mounted within the interior, the fiber optic connector accessible from outside the housing when the two housing portions are removed in a direction generally perpendicular to the longitudinal axis of the housing;
    the cable entry end of the housing configured to receive a hybrid fiber/copper cable from outside the housing into the interior, the hybrid fiber/copper cable including at least one optical fiber and at least one pair of electrical wires;
    the housing including a cable management structure within the interior positioned between the cable entry end and the fiber optic connector, the cable management structure accessible from outside the housing when the two housing portions are removed in a direction generally perpendicular to the longitudinal axis of the housing.

2. The connector of claim 1, wherein the housing is formed from two identical housing halves.

3. The connector of claim 2, wherein the housing defines an inner housing and the inner housing is positioned within an outer housing.

4. The connector of claim 1, wherein the hybrid fiber/copper cable includes a pair of optical fibers and two pairs of electrical wires, and the hybrid fiber and electrical cable connector includes a fiber optic connector for terminating each optical fiber and a pin connector for terminating each electrical wire.

5. The connector of claim 1, wherein the cable management structure within the interior includes a pair of posts about which either the optical fibers or the electrical wires may extend between the cable entry end and the fiber optic connector.

6. The connector of claim 1, wherein the cable entry end of the housing includes a cable clamp which fits about and may be secured to the cable as the cable extends through the cable entry end of the housing.

7. The connector of claim 1, wherein the interior of the housing includes a fiber connector retainer extending across a portion of the interior adjacent the mating end, the fiber connector retainer including at least one opening for mounting the fiber optic connector so that a terminal end of an optical fiber terminated by the fiber optic connector is accessible through the mating end.

8. The connector of claim 7, wherein the interior of the housing includes a slot and the pin connector includes a mounting flange which is received within the slot to position the pin connector within the interior adjacent the mating end and the fiber optic connector.

9. The connector of claim 1, wherein each of the housing portions includes a cable management structure within the interior.

10. The connector of claim 9, further comprising a cable retainer which engages the cable management structures of each housing portion.

11. A hybrid fiber/copper connector for terminating a hybrid fiber/copper cable, the hybrid fiber/copper connector comprising:
    a first outer housing with a mating end and a cable entry end, the first outer housing defining a first longitudinal axis extending from the mating end to the cable entry end;
    a first inner housing removably mounted within the first outer housing in a direction extending generally along the first longitudinal axis of the first outer housing, the first inner housing defining a second longitudinal axis, the first inner housing formed from two inner housing portions removably mounted to each other in a direction generally perpendicular to the second longitudinal axis of the first inner housing,
    at least one fiber optic connector removably mounted within one of the first inner housing portions adjacent the mating end; and
    at least one electrical pin carried by a pin housing that is removably mounted within the other of the first inner housing portions adjacent the mating end.

12. The connector of claim 1, wherein the first outer housing includes an interior wall fitting closely about the first inner housing and holding the two housing portions of the first inner housing together.

13. The connector of claim 11, wherein the hybrid fiber/copper cable includes at least a pair of optical fibers and at least two pairs of electrical wires, and the hybrid fiber/copper connector includes a fiber optic connector for terminating each optical fiber and an electrical pin for terminating each electrical wire of the hybrid fiber/copper cable.

14. The connector of claim 11, wherein the fiber optic connector is an LX.5 format connector.

15. A hybrid fiber/copper connector for terminating a hybrid fiber/copper cable, the hybrid fiber/copper connector comprising:
    a first outer housing with a mating end and a cable entry end, the first outer housing defining a first longitudinal axis extending from the mating end to the cable entry end;

a first inner housing removably mounted within the first outer housing in a direction extending generally along the first longitudinal axis of the first outer housing, the first inner housing defining a second longitudinal axis, the first inner housing formed from two inner housing portions removably mounted to each other in a direction generally perpendicular to the second longitudinal axis of the first inner housing, at least one fiber optic adapter removably mounted within one of the first inner housing portions adjacent the mating end; and at least one electrical pin carried by a pin housing that is removably mounted within the other of the first inner housing portions adjacent the mating end.

16. The connector of claim 15, wherein the first outer housing includes an interior wall fitting closely about the first inner housing and holding the two housing portions of the first inner housing together.

17. The connector of claim 15, wherein the hybrid fiber/copper cable includes at least a pair of optical fibers and at least two pairs of electrical wires, and the hybrid fiber/copper connector includes a fiber optic connector for terminating each optical fiber and an electrical pin for terminating each electrical wire, each fiber optic connector being received within the fiber optic adapter.

18. The connector of claim 15, wherein the fiber optic adapter is a duplex adapter.

19. The connector of claim 15, wherein the fiber optic adapter is configured to receive an LX.5 format fiber optic connector.

20. A hybrid fiber/copper connector assembly comprising:

a first hybrid fiber/copper connector including a first outer housing with a mating end and a cable entry end, the first outer housing defining a first longitudinal axis extending from the mating end to the cable entry end, the first hybrid fiber/copper connector also including a first inner housing removably mounted within the first outer housing in a direction extending generally along the first longitudinal axis of the first outer housing, the first inner housing defining a second longitudinal axis, the first inner housing formed from two inner housing portions removably mounted together in a direction generally perpendicular to the second longitudinal axis of the first inner housing; and a second hybrid fiber/copper connector including a second outer housing with a mating end that is adapted to mate with the mating end of the first hybrid fiber/copper connector and a cable entry end, the second outer housing defining a third longitudinal axis extending from the mating end to the cable entry end, the second hybrid fiber/copper connector also including a second inner housing removably mounted within the second outer housing in a direction extending generally along the third longitudinal axis of the second outer housing, the second inner housing defining a fourth longitudinal axis, the second inner housing formed from two inner housing portions removably mounted together in a direction generally perpendicular to the fourth longitudinal axis of the second inner housing;

wherein the first hybrid fiber/copper connector includes at least one fiber optic adapter removably mounted within one of the first inner housing portions adjacent the mating end and at least one electrical pin carried by a first pin housing that is removably mounted within the other of the first inner housing portions adjacent the mating end;

wherein the second hybrid fiber/copper connector includes at least one fiber optic connector removably mounted within one of the second inner housing portions adjacent the mating end and at least one electrical pin carried by a second pin housing that is removably mounted within the other of the second inner housing portions adjacent the mating end;

wherein the fiber optic connector of the second hybrid fiber/copper connector is configured to mate with the fiber optic adapter of the first hybrid fiber/copper connector and the electrical pin carried by the removably mounted second pin housing of the second hybrid fiber/copper connector is adapted to electrically mate with the electrical pin carried by the removably mounted first pin housing of the first hybrid fiber/copper connector.

* * * * *